(12) United States Patent
Bach

(10) Patent No.: US 12,190,425 B2
(45) Date of Patent: Jan. 7, 2025

(54) VIRTUAL REPRESENTATION WITH DYNAMIC AND REALISTIC BEHAVIORAL AND EMOTIONAL RESPONSES

(71) Applicant: Artificial Intelligence Foundation, Inc., Las Vegas, NV (US)

(72) Inventor: Joscha Bach, Las Vegas, CA (US)

(73) Assignee: Artificial Intelligence Foundation, Inc., Las Vegas, NV (US)

( * ) Notice: Subject to any disclaimer, the term of this patent is extended or adjusted under 35 U.S.C. 154(b) by 0 days.

(21) Appl. No.: 17/340,591

(22) Filed: Jun. 7, 2021

(65) Prior Publication Data
US 2022/0284649 A1    Sep. 8, 2022

Related U.S. Application Data

(60) Provisional application No. 63/157,690, filed on Mar. 6, 2021.

(51) Int. Cl.
  *G06T 13/40* (2011.01)
  *G06T 13/20* (2011.01)
  (Continued)

(52) U.S. Cl.
  CPC ............ *G06T 13/40* (2013.01); *G06T 13/205* (2013.01); *G06V 40/174* (2022.01); *G06V 40/20* (2022.01); *G10L 25/63* (2013.01); *G10L 25/90* (2013.01)

(58) Field of Classification Search
  CPC ..... G06T 13/40; G06T 13/205; G06V 40/174; G06V 40/20; G10L 25/63; G10L 25/90
  See application file for complete search history.

(56) References Cited

U.S. PATENT DOCUMENTS

| 7,042,639 B1 * | 5/2006 | McDowell ......... G02B 21/0004 |
| | | 359/398 |
| 10,922,850 B1 * | 2/2021 | Harrison .................. G06N 3/10 |

(Continued)

FOREIGN PATENT DOCUMENTS

WO    WO-2018113260 A1 *    6/2018    ............... G06N 3/00

OTHER PUBLICATIONS

K. Kurashige and K. Nikaido, "Self-generation of reward in reinforcement learning by universal rules of interaction with the external environment," 2014 IEEE Symposium on Robotic Intelligence in Informationally Structured Space (RiiSS), Orlando, FL, USA, 2014, pp. 1-6, doi: 10.1109/RIISS.2014.7009176. (Year: 2014).*

(Continued)

*Primary Examiner* — William A Beutel
(74) *Attorney, Agent, or Firm* — Steven Stupp

(57) ABSTRACT

An electronic device that provides a virtual representation is described. During operation, the electronic device may receive sensory inputs associated with a user. Then, the electronic device may determine one or more behavioral or emotional inputs based at least in part on the sensory inputs. Moreover, the electronic device may compute a modification to a behavioral or an emotional response of a virtual representation based at least in part on the one or more behavioral or emotional inputs, a behavioral and emotional model, and a set of predefined or predetermined parameters, where the behavioral and emotional model includes one or more purposes that reflect a personality of the virtual representation, and where a given purpose models an expected reward associated with a given need of the virtual representation. Next, the electronic device may provide or present the modification to the behavioral or the emotional response of the virtual representation.

20 Claims, 16 Drawing Sheets

(51) Int. Cl.
*G06V 40/16* (2022.01)
*G06V 40/20* (2022.01)
*G10L 25/63* (2013.01)
*G10L 25/90* (2013.01)

(56) References Cited

U.S. PATENT DOCUMENTS

| | | | |
|---|---|---|---|
| 2015/0070351 A1* | 3/2015 | Tarquini | G06T 17/20 345/419 |
| 2018/0157901 A1* | 6/2018 | Arbatman | H04L 51/10 |
| 2019/0074081 A1* | 3/2019 | Easton | G06Q 10/10 |
| 2019/0163270 A1* | 5/2019 | Da Silva | A61B 5/1118 |
| 2021/0103782 A1* | 4/2021 | Rubin | G06V 10/24 |

OTHER PUBLICATIONS

Li, Yang; Zheng, Wenming; Wang, Lei; Zong, Yuan; and Cui, Zhen, "From Regional to Global Brain: A Novel Hierarchical Spatial-Temporal Neural Network Model for EEG Emotion Recognition" (2019). Faculty of Engineering and Information Sciences—Papers: Part B. 3493. (Year: 2019).*

* cited by examiner

VIRTUAL REPRESENTATION WITH DYNAMIC AND REALISTIC BEHAVIORAL AND EMOTIONAL RESPONSES

CROSS REFERENCE TO RELATED APPLICATIONS

This application claims priority under 35 U.S.C. 119(e) to U.S. Provisional Application Ser. No. 63/157,690, entitled "Virtual Representation with Dynamic and Realistic Behavioral and Emotional Responses," by Joscha Bach, filed on Mar. 6, 2021, the contents of which are herein incorporated by reference.

FIELD

The described embodiments relate to techniques for providing a virtual representation that has dynamic behavioral and emotional responses that realistically mimic those of an individual.

BACKGROUND

Advances in neural networks, such as deep learning, have proven useful in compressing information and modeling a variety of complicated phenomena. For examples, neural networks are increasingly able to provide photorealistic representations of individuals, including their appearance and mannerisms (such as gestures).

However, dynamic interactions with such a virtual representation (which is sometimes referred to as an 'agent,' a 'puppet' or a 'mind twin') are often less accurate. Notably, the behavioral and emotional responses of most virtual representations are usually predefined or scripted (such as in a typical video game) or are based on overly simplistic (and, thus, inaccurate) models of human behaviors and emotions.

Emotional recognition plays an important role in social interactions. Recent research suggests that, when people perceive an emotional expression, they at least partially activate or mirror the respective emotion in themselves. Consequently, when there are errors or inaccuracies in a virtual representation (such as in facial expression, vocal or bodily expression, and/or other aspects of emotional response), a user interacting with the virtual representation may perceive an incorrect emotional expression of the virtual representation and, thus, may at least partially activate or mirror the incorrect respective emotion in themselves. Moreover, because many emotions result in corresponding somatic responses, the inaccuracies may quite literally cause the user to viscerally feel that something is wrong with the virtual representation. Therefore, errors in the behavioral and emotional responses of the virtual representation can tiring or uncomfortable for the user, and can degrade their social interaction and engagement with the virtual representation.

SUMMARY

An electronic device that provides a virtual representation is described. This electronic device may include: a processor; and memory that stores program instructions that are executed by the processor. During operation, the electronic device may receive sensory inputs associated with a user. Then, the electronic device may determine one or more behavioral or emotional inputs based at least in part on the sensory inputs. Moreover, the electronic device may compute a modification to a behavioral or an emotional response of the virtual representation based at least in part on the one or more behavioral or emotional inputs, a behavioral and emotional model, and a set of predefined or predetermined parameters, where the behavioral and emotional model includes one or more purposes that reflect a personality of the virtual representation, and where a given purpose models an expected (or future) reward associated with a given need of the virtual representation. Next, the electronic device may provide or present the modification to the behavioral or the emotional response of the virtual representation.

For example, the sensory inputs may include: one or more images of a facial expression, a posture, a gaze direction, a gaze pattern, a head position, a blinking frequency, a muscular tension, or a gesture of the user, audio information associated with the user (such as speech or audible sound of the user), and/or a physiological response of the user.

Moreover, the one or more behavioral or emotional inputs may include: the facial expression, the posture, the gaze direction, the gaze pattern, the head position, the blinking frequency, the muscular tension, and/or the gesture (which may be determined by performing image analysis on the one or more images using an image-processing technique or a predetermined neural network); a syntax, a tone or pitch, an intensity, an inflection, and/or a prosodic characteristic, such as a pause in the speech and/or disfluences in the speech (which may be determined using a signal-processing transformation and/or a second predetermined neural network); and/or a pulse, a respiration, blood pressure (and, more generally, a vital sign), skin temperature, skin conductance and/or flushing or local capillary dilation of the user.

Furthermore, the electronic device may receive information that specifies a characteristic or an attribute of an environment of the user, and the modification to the behavioral or the emotional response of the virtual representation may be based at least in part on the characteristic or the attribute.

Additionally, the one or more purposes may include multiple purposes that have a hierarchical arrangement.

In some embodiments, the reward corresponds to pleasure (such as a positive value) for satisfaction of the given need and corresponds to pain (such as a negative value) for frustration of the given need.

Note that the given need may include: a physiological need, a social need or a cognitive need.

Moreover, the behavioral and emotional model may include a dynamic attentional focus and the behavioral or the emotional response of the virtual representation may be based at least in part on the attentional focus. Furthermore, the dynamic attentional focus may be based at least in part on the behavioral or the emotional response of the virtual representation. Thus, the interaction between the dynamic attentional focus and the behavioral or the emotional response of the virtual representation in the behavioral and emotional model may be unidirectional or bidirectional.

Another embodiment provides a computer-readable storage medium for use in conjunction with the electronic device. This computer-readable storage medium includes the program instructions for at least some of the operations performed by the electronic device.

Another embodiment provides a method for providing a virtual representation. The method includes at least some of the aforementioned operations performed by the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

The included drawings are for illustrative purposes and serve only to provide examples of possible structures and arrangements for the disclosed systems and techniques. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
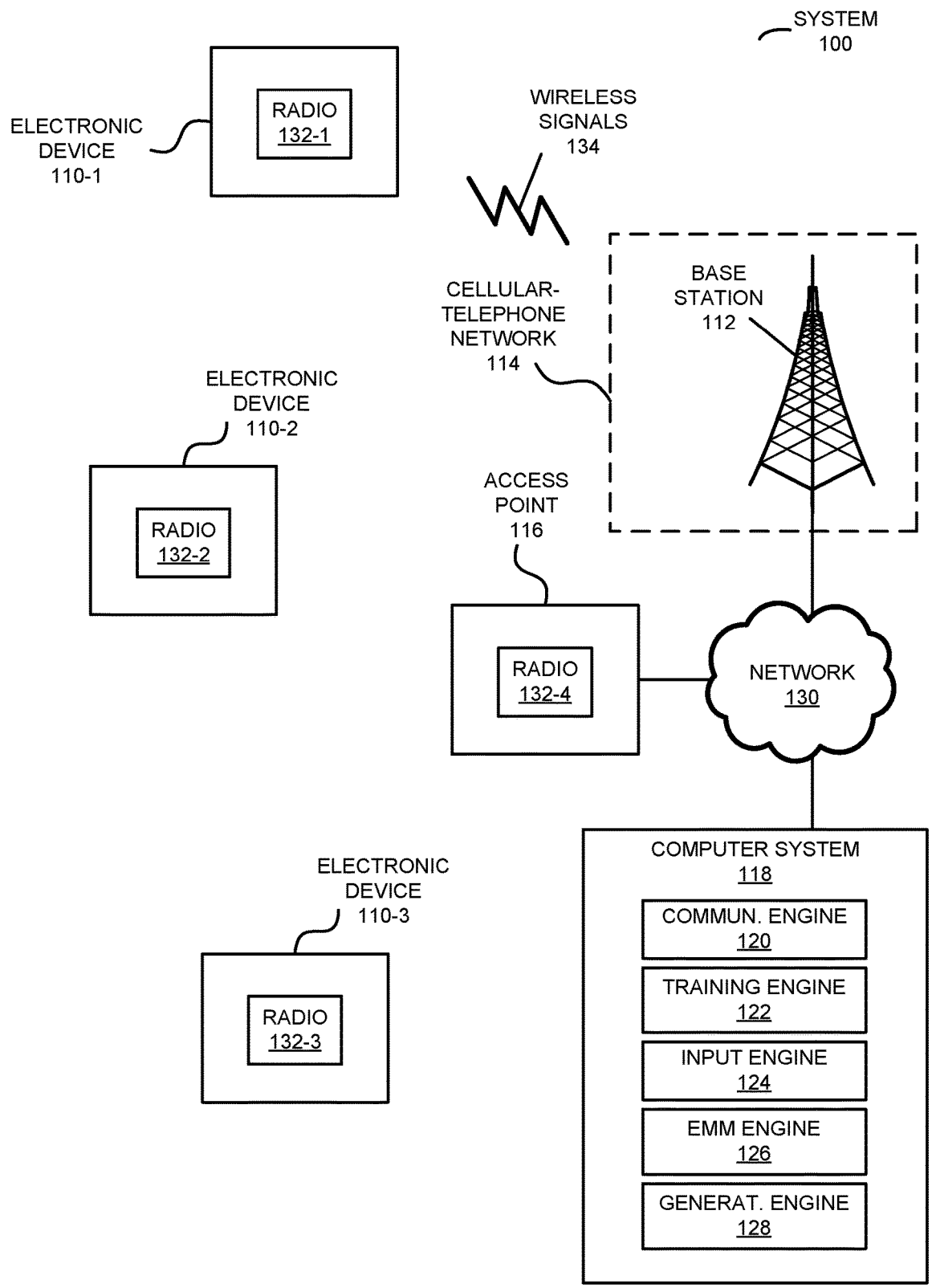
FIG. 1 is a block diagram illustrating an example of a system that provides a virtual representation with dynamic and realistic behavioral and emotional responses in accordance with an embodiment of the present disclosure.

An electronic device that provides a virtual representation is described. During operation, the electronic device may receive sensory inputs associated with a user. Then, the electronic device may determine one or more behavioral or emotional inputs based at least in part on the sensory inputs. Moreover, the electronic device may compute a modification to a behavioral or an emotional response of a virtual representation based at least in part on the one or more behavioral or emotional inputs, a behavioral and emotional model, and a set of predefined or predetermined parameters, where the behavioral and emotional model includes one or more purposes that reflect a personality of the virtual representation, and where a given purpose models an expected (or future) reward associated with a given need of the virtual representation. Next, the electronic device may provide or present the modification to the behavioral or the emotional response of the virtual representation.

By modifying the behavioral or the emotional response, these simulation techniques may help ensure that the behavioral or the emotional response of the virtual representation is dynamic and realistic. Notably, the simulation techniques may provide a more-faithful or realistic imitation or simulation of the behavioral or the emotional responses of a human. Consequently, user interactions with the virtual representation may be perceived or may feel more accurate and familiar. For example, the dynamic and realistic behavioral or the emotional responses of the virtual representation may facilitate intuitive emotional recognition by a user. Therefore, the user interactions with the virtual representation may be less tiring, more comfortable and engaging.

In the discussion that follows, an individual or a user may be a person. In some embodiments, the techniques are used by a type of organization instead of a user, such as a business (which should be understood to include a for-profit corporation, a non-profit corporation or another type of business entity), a group (or a cohort) of individuals, a sole proprietorship, a government agency, a partnership, etc.

Moreover, in the following discussion, a virtual representation may be a computer or electronically generated or modified simulation that automatically and realistically mimics one or more attributes of a real individual or an imagined individual, such as: mannerisms, an appearance a sense of humor, facial expressions, a style of speech, a behavioral or an emotional response, another aspect of their personality, etc. The virtual representation may provide or may have authentic (i.e., human-like) interactions and emotional responses, such as during a conversation with a user. Thus, the user may find that the virtual representation is a faithful (or even, to a human eye/ear, an indistinguishable) representation of the individual. In some embodiments, the virtual representation may include a multi-dimensional puppet (which is sometimes referred to as a '2.5D puppet' or a '3D puppet' that includes stereopsis and/or prehension). Furthermore, the virtual representation may provide a complicated head and body movement that is capable of being manipulated in real time in an environment, e.g., in a Web browser, on a display or a virtual reality environment. Note that the virtual representation may be generated using one or more predetermined neural networks and/or one or more core region characterizations, phonemes, sets, deformations and/or core region sprites (such as a two-dimensional (2D) or a three-dimensional (3D) bitmap).

In the discussion that follows, electronic devices and/or components in a computer system (which may include one or more computers or electronic devices) may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Texas), Bluetooth™ (from the Bluetooth Special Interest Group of Kirkland, Washington), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet, a cellular-telephone communication protocol and/or Wi-Fi are used as illustrative examples.

Communication among electronic devices is shown in FIG. 1, which presents a block diagram illustrating an example of a system 100 that provides a virtual representation. System 100 may include: one or more electronic devices 110 (such as one or more computers and/or one or more portable electronic devices, e.g., one or more cellular telephones), optional base station 112 in cellular-telephone network 114, optional access point 116 (such as a physical access point or a virtual access point that is implemented using software), and/or a computer system 118 (such as one or more computers or servers at one or more locations), which are sometimes collectively referred to as 'components' in system 100. Moreover, computer system 118 may include: communication engine 120 (or module), training engine 122 (or module), input engine 124 (or module), an emotion and motivation model (EMM) engine 126 (or module), and/or generating engine 128 (or module).

Note that components in system 100 may communicate with each other via a network 130, such as the Internet, a cellular-telephone network (such as cellular-telephone network 114) and/or a wireless local area network (WLAN). Thus, the communication may involve wired and/or wireless communication. In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets or frames.

Figure 15:
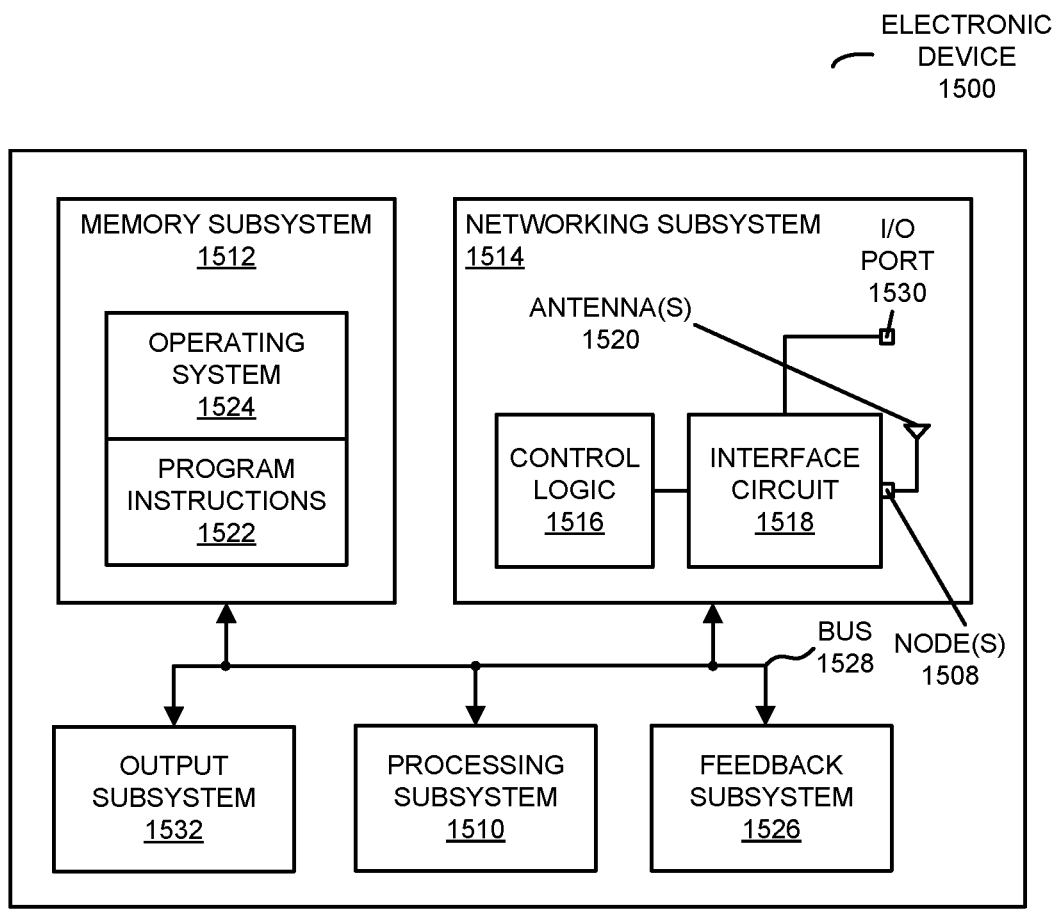
FIG. 15 is a block diagram illustrating an electronic device in accordance with an embodiment of the present disclosure.

As described further below with reference to FIG. 15, the one or more electronic devices 110, the optional base station 112, the optional access point 116 and/or computer system 118 may include subsystems, such as a networking subsystem, a memory subsystem and a processor subsystem. In addition, the one or more electronic devices 110, the optional base station 112, the optional access point 116 and/or computer system 118 may include radios 132 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 134 (represented by a jagged line) are transmitted by radios 132 in the components. For example, radio 132-1 in electronic device 110-1 may transmit information (such as packets or frames) using wireless signals. These wireless signals may be received by radios 132 in one or more of the other components, such as by optional base station 112 or optional access point 116. This may allow electronic device 110-1 to communicate information to optional base station 112 or optional access point 116, and thus, to computer system 118.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame.

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, dynamic and realistic simulation of the behavioral and/or emotional responses of a virtual representation may enhance emotional recognition and engagement by a user of computer system 118. These capabilities may be provided by computer system 118, which implements the simulation techniques.

Notably, generating engine 128 may generate a virtual representation. Lip movements of the virtual representation may be synchronized with any generated output speech. Information specifying the virtual representation (such as video) may be provided by communication engine 120 to one or more of electronic devices 110 (such as electronic device 110-1). Then, electronic device 110-1 may present, output or display the virtual representation, e.g., on a display in or associated with electronic device 110-1 and/or may output sound (such as audio content or speech associated with the virtual representation) using one or more speakers in or associated with electronic device 110-1.

Moreover, a user of electronic device 110-1 may interact with the virtual representation. This interaction may be direct or active (such as a portion of a conversation that the user is having with the virtual representation, e.g., a question that the user asks the virtual representation) and/or indirect. For example, information that specifies or corresponds to the interaction may include: a facial expression of the user, a posture of the user, a gaze direction of the user, a gaze pattern or a temporal sequence of gaze directions of the user, a blinking frequency of the user, muscular tension of the user, a head position of the user, a gesture performed by the user, a syntax of the user, a tone or pitch of the user, an intensity of the user's speech, an inflection of the user's speech, a pause in the user's speech, a disfluence in the user's speech (such as 'um', 'er', etc.), another prosodic characteristic in the user's speech, and/or a physiological response of the user, e.g., a vital sign of the user). Therefore, the interaction (or information corresponding to the interaction) may include a conscious action of the user made with volition and/or a subconscious action of the user (such as an instinctive action or a reflex).

Electronic device 110-1 may include one or more sensors that capture or measure information about the user during the interaction with the virtual representation. For example, the one or more sensors may include one or more image sensors (such as a camera, a video recorder, a CCD sensor, a CMOS sensor, etc.) that capture one or more images of the user from one or more perspectives or directions relative to the user. Moreover, the one or more sensors may include one or more acoustic sensors (such as a microphone, an array of microphones) that capture acoustic or audio information associated with the user (such as a magnitude and/or phase of audible sound or speech of the user). Furthermore, the one or more sensors may include one or more physiological sensors (such as an infrared pulse or oxygenation monitor, radar, a sphygmomanometer, a thermometer, an infrared sensor or camera, a galvanic skin-response sensor, an electroencephalogram or EEG, etc.) that monitor or measure one or more physiological responses of the user, such as: a pulse of the user, a respiration of the user, a blood pressure of the user, a vital sign of the user, a skin temperature of the user, a skin conductance of the user, flushing or local capillary dilation of the user and/or electrical activity of the user's brain or nervous system. Note that the one or more sensors may be in contact with the user and/or may be noninvasive or remote from the user. In some embodiments, the one or more physiological responses of the user are measured or inferred from the one or more images and/or the acoustic information. While the preceding discussion illustrated examples of sensors that may provide sensory information that is used in the simulation techniques, in other embodiments there may be one or more fewer or additional sensors, such as a haptic sensor, a time-of-flight sensor, etc.

Next, electronic device 110-1 may provide sensory information or inputs (such as the one or more images, the acoustic information, one or more physiological measurements, etc.) to computer system 118. After receiving the sensory inputs, communication engine 120 may provide the sensory inputs to input engine 124, which may determine one or more behavioral or emotional inputs based at least in part on the sensory inputs. For example, one or more image-processing techniques may be used to determine or extract one or more visual features from the one or more images (such as a portion of the facial expression of the user, the posture of the user, the gaze direction of the user, etc.), one or more acoustic-processing techniques may be used to determine or extract one or more acoustic features from the acoustic information (such as the syntax of the user, the tone or pitch of the user, the intensity of the user's speech, an inflection of the user's speech, etc.), and/or the one or more physiological measurements may be analyzed to determine one or more physiological responses of the user (such as a vital sign of the user). In some embodiments, the one or more behavioral or emotional inputs may include an inferred or a perceived emotion of the user.

The one or more image-processing techniques may include: a discrete Fourier transform, principal component analysis, histogram analysis, a feature-selection technique, a feature-extraction technique, and/or JPEG (or compression) analysis. In some embodiments, the one or more image-processing techniques include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), etc. Moreover, in some embodiments, the one or more visual features are determined using one or more predetermined neural networks (such as a convolutional neural network, a recurrent neural network, one or more multi-layer perceptrons, a combination of the neural networks, a generative adversarial network, etc.) and/or machine-learning models.

Note that an image may include one or more of: a 2D image, a 2.5D image, a 3D image (e.g., with stereoscopic information or a hologram), etc. Furthermore, an image may be compatible with a wide variety of different resolutions and/or file formats, such as one or more of: a Joint Photographic Experts Group (JPEG) or JPEG File Interchange format, JPEG 2000, an Exchangeable image file format (Exif), a Tagged Image File Format (TIFF), a Graphics Interchange Format (GIF), a bitmap file format (such as BMP), a Portable Network Graphics (PNG) file format, a Netpbm format, a WebP format, a Better Portable Graphics (BPG) format, a Photoshop file format (from Adobe Systems of San Jose, California), a High Efficiency Image File Format (HEIF) and/or another image file format. Alternatively or additionally, in embodiments where the image includes a video, the video may be compatible with a variety of different resolutions and/or file formats, such as one or more of: an Audio Video Interleave (AVI) format, a Flash Video Format (FVF or SWF), a Windows Media Video (WMV), a Quick Time video format, Moving Pictures Expert Group 4 (MPEG 4 or MP4), an MOV format, a matroska (MKV) format, an advanced vide coding, high definition (AVCHD) format, and/or another video file format.

Furthermore, the one or more acoustic-processing techniques may include: a Fourier transform (such as a fast Fourier transform or FFT, or a discrete Fourier transform or DFT), analysis to determine a spectrogram (or magnitude information as a function frequency), analysis to determine a phasegram (or phase information as a function of frequency), a cosine transformation of a power spectrum of the acoustic content (such as a linear cosine transformation of a logarithm of the power spectrum on a nonlinear mel scale of frequency, so that the one or more acoustic features may be represented using one or more mel-frequency cepstral coefficients that collectively make up a mel-frequency cepstrum), pitch detection, tonality, harmonicity, spectral centroid, pitch contour, prosody analysis (e.g., pauses, disfluences), syntax analysis, lexicography analysis, principal component analysis, a feature-selection technique, a feature-extraction technique, and/or another signal-processing transformation. In some embodiments, the one or more acoustic features are determined using one or more predetermined neural networks (such as a convolutional neural network, a recurrent neural network, one or more multi-layer perceptrons, a combination of the neural networks, a generative adversarial network, etc.) and/or machine-learning models. For example, the one or more acoustic-processing techniques may include word embedding (or vector representations of words in the acoustic content) and/or sense embedding (or vector representations of the meanings of words in the acoustic content). The one or more acoustic features may (or may not) be to the language of the speech of the user and, thus, may not (or may) involve natural language processing.

Note that the acoustic content may include sound or information that specifies sound (such as an audio recording) in an audible band of frequencies. For example, acoustic content may include frequencies between 20 and 20,000 Hz. However, in other embodiments, different (smaller) ranges of frequencies may be used, such as: between 100 and 10,000 Hz, between 300 and 3,400 Hz (e.g., in a voice band), etc. The acoustic content may include monoaural sound, stereophonic sound, binaural sound, 3D audio, surround sound, etc. Furthermore, the acoustic content may have a variety of bit depths, sampling rates and/or encoding techniques, such as: 16-bit, 44.1 kHz pulse-code modulation (PCM); 24-bit, 48 kHz PCM; 24-bit, 96 kHz PCM; 24-bit, 192 kHz PCM; 1-bit, 2.8 MHz direct stream digital or DSD (from Sony Corp. of Sony City Japan, and Koninklijke Philips N. V. of Amsterdam, The Netherlands), etc. Additionally, the acoustic content may be compatible with a variety of uncompressed audio formats, lossless compressed audio formats, lossy compressed audio formats, and/or video formats. For example, the acoustic content may be compatible with one or more of: an advanced audio coding (AAC) format, a CD or DVD audio format, a waveform (WAV) audio format, an audio interchange file format (AIFF), a Moving Pictures Expert Group (MPEG)-1 audio layer 3 (MP3) format, an OGG format, a Windows media audio (WMA) format, a free lossless audio codex (FLAC) format, an Apple lossless audio codec (ALAC), another audio format, an Audio Video Interleave (AVI) format, a Flash Video Format (FVF or SWF), a Windows Media Video (WMV), a Quick Time video format, an MPEG 4 or MP4 format, an MOV format, a matroska (MKV) format, an advanced vide coding, high definition (AVCHD) format, and/or another video format.

In some embodiments, the analysis of at least some of the sensory information (such as the one or more physiological measurements) may involve one or more analysis techniques, such as: a Fourier transform (e.g., an FFT or a DFT), filtering (such as low-pass or bandpass filtering), and/or another transformation (such as demodulating a signal on at a carrier frequency to baseband, mapping from first values to second values using a predetermined or predefined lookup table or functional relationship, etc.).

Moreover, input engine 124 may provide the determined one or more behavioral or emotional inputs to EMM engine 126 and, optionally, generating engine 128. As described further below with reference to FIGS. 2-14, EMM engine 126 may compute a modification to a behavioral and/or an emotional response of the virtual representation based at least in part on the one or more behavioral or emotional inputs, a behavioral and emotional model, and a set of predefined or predetermined parameters for the behavioral and emotional model. For example, the modification to the behavioral and/or the emotional response of the virtual representation may include: a facial expression of the virtual representation, a posture of the virtual representation, a gaze direction of the virtual representation, a gaze pattern of the virtual representation, a blinking frequency of the virtual representation, a muscular tension of the virtual representation, a head position of the virtual representation, a gesture performed by the virtual representation, a syntax of the virtual representation, a tone or pitch of the virtual representation, an intensity of speech of the virtual representation, an inflection of speech of the virtual representation, a pause in the speech of the virtual representation, a disfluence in the speech of the virtual representation, another prosodic characteristic of the speech of the virtual representation, one or more responses corresponding to one or more emotions expressed by the virtual representation (such as anger, happiness, surprise, etc.). In this way, the behavioral and/or the emotional response of the virtual representation may adapt or respond to the interaction with the user.

Note that the behavioral and emotional model may include one or more purposes that reflect a personality of the virtual representation, and a given purpose may model an expected (or future) reward associated with a given need of the virtual representation. Moreover, the one or more purposes may include multiple purposes that have a hierarchical arrangement, which corresponds to or specifies a personality of the virtual representation. Note that the reward may correspond to pleasure (such as a positive value) for satisfaction of the given need and/or may correspond to pain (such as a negative value) for frustration of the given need. In some embodiments, the given need may include: a physiological need, a social need and/or a cognitive need.

Alternatively or additionally, the behavioral and emotional model may include a dynamic attentional focus, and the behavioral and/or the emotional response of the virtual representation may be based at least in part on the attentional focus. Furthermore, the dynamic attentional focus may be based at least in part on the behavioral and/or the emotional response of the virtual representation. Thus, the interaction between the dynamic attentional focus and the behavioral and/or the emotional response of the virtual representation in the behavioral and emotional model may be unidirectional or bidirectional.

In some embodiments, the sensory information received from electronic device 110-1 may specify one or more characteristics or attributes of an environment of the user (such as the surrounding environment where the user is located). Input engine 124 may determine the one or more characteristics or attributes of the environment, and may provide this information or one or more environmental features to EMM engine 126 and, optionally, generating engine 128. EMM engine 126 may computer the modification to the behavioral and/or the emotional response of the virtual representation based at least in part on the one or more characteristics or attributes of the environment. In this way, the behavioral and/or the emotional response of the virtual representation may adapt to a change in the environment of the user (and, more generally, a context associated with the environment).

Furthermore, EMM engine 126 may provide information specifying the modification to the behavioral and/or the emotional response of the virtual representation to generating engine 128. Using this information and, optionally, the determined one or more behavioral or emotional inputs, generating engine 128 may generate a modification to the virtual representation. In some embodiments, the modification to the virtual representation is generated based at least in part on the one or more characteristics or attributes of the environment.

Then, communication engine 120 may provide information specifying the modified virtual representation (such as video) to electronic device 110-1. Electronic device 110-1 may present, output or display the modified virtual representation, e.g., on the display in or associated with electronic device 110-1 and/or may output sound (such as audio content or speech associated with the virtual representation) using one or more speakers in or associated with electronic device 110-1. In some embodiments, computer system 118 may provide the modified virtual representation to electronic device 110-1 (and, thus, to the user) in real time in response to the dynamic interaction with the user.

Additionally, prior to providing the information specifying the virtual representation or the modified virtual representation, training engine 122 may, using one or more training datasets (with real and/or synthetic data) train one or more machine-learning models, train one or more neural networks, and/or determine the parameters for the behavioral and emotional model. For example, training engine 122 may use the results of physiological testing of an individual (such as one or more characteristics or attributes associated with a personality of the individual) to select the set of parameters (such as weights associated with the parameters or numerical values of the parameters). Then, training engine 122 may compare 'predicted' behavioral and/or emotional responses determined by EMM engine 126 using the selected set of parameters with those of the individual in different circumstances in a training dataset, and may, as needed, modify the set of parameters (such as using gradient descent optimization). In some embodiments, the set of parameters is selected based at least in part on: a gender of the individual, an ethnicity of the individual, a demographic attribute of the individual, and/or a culture or nationality associated with the individual.

In some embodiments, via communication engine 120, an operator of computer system 118 may provide feedback to computer system 118 about the performance of the virtual representation. In these embodiments, training engine 122 may use this feedback to automatically perform reinforced learning on EMM engine 126 (such as the selected set of parameters) and/or generating engine 128. This may facilitate closed-loop adaptation of the virtual representation. Note that the adaptation based at least in part on user feedback may be performed: continuously, periodically or as needed (such as depending on the performance, e.g., the accuracy, of the virtual representation). In these ways, the accuracy of the simulation techniques may be improved, so that, over time, the accuracy is improved to better than 80, 90, 95 or 99%.

Moreover, in some embodiments, training engine 122 may use transfer learning to accelerate the training or construction of the behavioral and emotional model in EMM engine 126 and/or, e.g., a neural network in input engine 124 or generating engine 128. For example, when a virtual representation for a new individual (who has not been previously been modeled) is desired, a predetermined or predefined set of parameters for one or more other or different individuals may be used to provide starting values for the set of parameters for the individual. Alternatively or additionally, a predetermined neural network (which was training using a training dataset based real or simulated data for the one or more other or different individuals) may be retrained using a smaller real or synthetic training dataset with data of the individual. During this training, weights for the predetermined neural network may be modified. Note that the one or more other or different individuals may be selected based at least in part on similarities with the individual (such as based at least in part on the one or more characteristics or attributes associated with a personality of the individual). Similarly, the predetermined neural network that is related to or similar to the eventual retrained neural network may be selected.

While the preceding example illustrated the simulation techniques using computer system 118, in other embodiments some or all of the operations performed by computer system 118 may be performed by one or more other components in system 100. For example, sensory engine 124, input engine 126 (or module) and/or EMM engine 128 may be implemented in one or more of electronic devices 110. In some embodiments, at least some of the operations in the simulation techniques may be implemented using program instructions or software that is executed in an environment on electronic device 110-1, such as: an application executed in the operating system of electronic device 110-1, as a plugin for a Web browser or an application tool that is embedded in a web page and that executes in a virtual environment of the Web browser (e.g., in a client-server architecture), etc. Note that the software may be a stand-alone application or a portion of another application that is resident on and that executes on electronic device 110-1 (such as a software application that is provided by electronic device 110-1 or that is installed on and that executes on electronic device 110-1). Thus, the simulation techniques may be implemented locally and/or remotely, and may be implemented in a distributed or a centralized manner.

In embodiments that use one or more neural networks, different neural networks may be used to analyze the one or more images or the acoustic content. Similarly, different neural networks may be used to generate one or more images or acoustic content associated with the virtual representation.

Note that, in embodiments that use one or more machine-learning models, the one or more machine-learning models may include a supervised or an unsupervised machine-learning model. For example, classification may be performed using a classifier or numerical values may be provided by a regression model that was trained using a supervised learning technique (such as a support vector machine, a classification and regression tree, logistic regression, least absolute shrinkage and selection operator (LASSO), ridge regression, linear regression and/or another linear or nonlinear supervised-learning technique) and a training dataset. Alternatively, the unsupervised learning technique may include a clustering technique.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
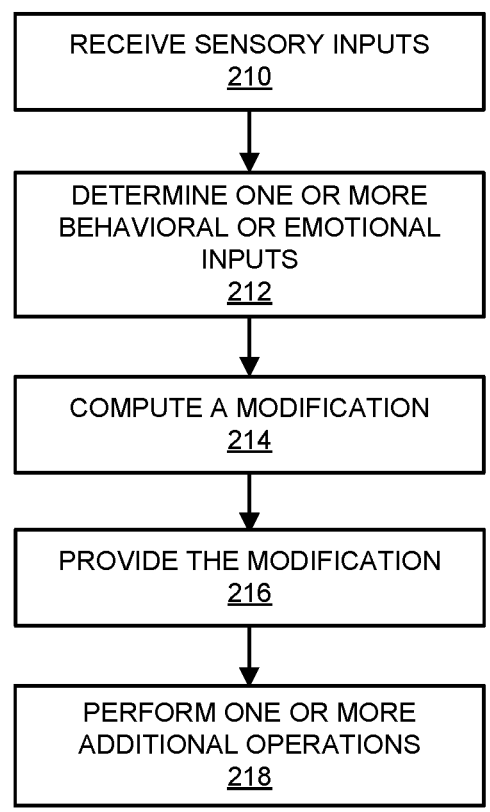
FIG. 2 is a flow diagram illustrating an example of a method for providing a virtual representation in accordance with an embodiment of the present disclosure.

We now further describe the simulation techniques. FIG. 2 presents embodiments of a flow diagram illustrating an example of a method 200 for providing a virtual representation, which may be performed by an electronic device (such as a computer in computer system 118 in FIG. 1). Notably, the electronic device may include a computation device that performs method 200. For example, the computation device may include one or more of: a processor, one or more cores in a second processor, or another type of device that performs computation (such as one or more graphics processing units or GPUs, which may implement a neural network).

During operation, the electronic device may receive sensory inputs (operation 210) associated with a user. For example, the sensory inputs may include: one or more images of a facial expression, a posture, a gaze direction, a gaze pattern, a blinking frequency, a muscular tension, a head position, or a gesture of the user, audio information associated with the user (such as speech or audible sound of the user), and/or a physiological response of the user.

Then, the electronic device may determine one or more behavioral or emotional inputs (operation 212) based at least in part on the sensory inputs. For example, the one or more behavioral or emotional inputs may include: the facial expression, the posture, the gaze direction, the gaze pattern, the blinking frequency, the muscular tension, the head position, and/or the gesture (which may be determined by performing image analysis on the one or more images using an image-processing technique or a predetermined neural network); a syntax, a tone or pitch, an intensity, an inflection, and/or a prosodic characteristic, such as a pause in the speech and/or disfluences in the speech (which may be determined using a signal-processing transformation and/or a second predetermined neural network); a pulse, a respiration, blood pressure (and, more generally, a vital sign), skin temperature, skin conductance and/or flushing or local capillary dilation of the user; and/or an inferred or perceived emotion of the user.

Moreover, the electronic device may compute a modification (operation 214) to a behavioral or an emotional response of the virtual representation based at least in part on the one or more behavioral or emotional inputs, a behavioral and emotional model, and a set of predefined or predetermined parameters, where the behavioral and emotional model includes one or more purposes that reflect a personality of the virtual representation, and where a given purpose models an expected (or future) reward associated with a given need of the virtual representation.

Note that the one or more purposes may include multiple purposes that have a hierarchical arrangement, which may correspond to or reflect a personality of the virtual representation. Furthermore, the reward may correspond to pleasure (such as a positive value) for satisfaction of the given need and/or may correspond to pain (such as a negative value) for frustration of the given need. In some embodiments, the given need may include: a physiological need, a social need or a cognitive need.

Next, the electronic device may provide (or present) the modification (operation 216) to the behavioral or the emotional response of the virtual representation.

In some embodiments, the electronic device may optionally perform one or more additional operations (operation 218). For example, the electronic device may receive information that specifies a characteristic or an attribute of an environment of the user, and the modification to the behavioral or the emotional response of the virtual representation may be based at least in part on the characteristic or the attribute.

Moreover, the behavioral and emotional model may include a dynamic attentional focus and the behavioral or the emotional response of the virtual representation may be based at least in part on the attentional focus. Furthermore, the dynamic attentional focus may be based at least in part on the behavioral or the emotional response of the virtual representation. Thus, the interaction between the dynamic attentional focus and the behavioral or the emotional response of the virtual representation in the behavioral and emotional model may be unidirectional or bidirectional.

In some embodiments of method 200, there may be additional or fewer operations. Furthermore, there may be different operations. Moreover, the order of the operations may be changed, and/or two or more operations may be combined into a single operation.

Figure 3:
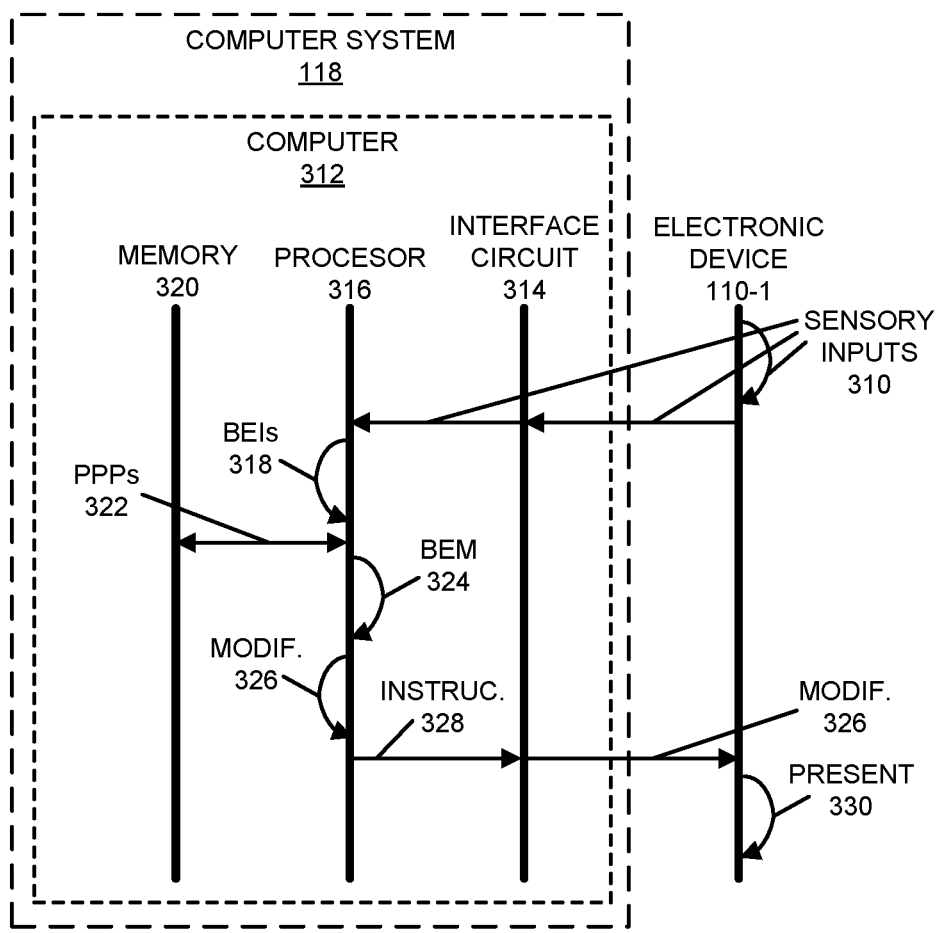
FIG. 3 is a drawing illustrating an example of communication among components in an electronic device in FIG. 1 in accordance with an embodiment of the present disclosure.

Embodiments of the simulation techniques are further illustrated in FIG. 3, which presents a drawing illustrating an example of communication among components in system 100 (FIG. 1). Notably, during the simulation techniques, electronic device 110-1 may capture or measure one or more sensory inputs 310 associated with a user. Then, electronic device 110-1 may provide information that specifies the one or more sensory inputs 310 to computer 312 in computer system 118.

After receiving the information that specifies sensory inputs 310, interface circuit 314 in computer 312 may provide the information that specifies sensory inputs 310 to processor 316 in computer 312. Then, processor 316 may determine one or more behavioral or emotional inputs (BEIs) 318 based at least in part on sensory inputs 310.

Moreover, processor 316 may access a set of predefined or predetermined parameters (PPPs) 322 in memory 320 in computer 312. Furthermore, processor 316 may execute a behavioral and emotional model (BEM) 324, and may use it to compute modification 326 to a behavioral or an emotional response of a virtual representation based at least in part on the one or more behavioral or emotional inputs 318, the behavioral and emotional model, and the set of predefined or predetermined parameters 322.

Next, processor 316 may an instruction 328 to interface circuit 314. In response, interface circuit 314 may provide information specifying modification 326 to electronic device 110-1. After receiving the information specifying modification 326, electronic device 110-1 may present 330 modification 326, e.g., by updating the virtual representation on a display in electronic device 110-1 and/or outputting acoustic information corresponding to modification 326.

While FIG. 3 illustrates unilateral communication between components (as shown using one-sided arrows), in some embodiments one or more of these communication operations involve bilateral communication.

We now further describe the simulation techniques. A dynamic EMM (which is sometimes referred to as an 'emotional intelligence engine') may be a cognitive and/or psychological model that provides a dynamic model of emotions and motivations. The EMM may provide a control system for an artificial intelligence (AI) architecture, a cognitive model, and/or a virtual representation (such as an artificial agent, e.g., a character in a computer game, an interface agent, a synthetic actor, a digital portrait of a person, etc.) that can elicit decision-making, emotional expression, action control, and/or the modulation of cognitive processing, perception and memory in a simulation of a real individual or a fictitious or imaginary individual. Thus, the EMM may be used as a framework to model human behavior, e.g., to facilitate interaction by one or more users with the virtual representation (such as in a video game or during a conversation). Note that the EMM may aim for psychological plausibility, human-like variability, and suitability for implementation in a real-time computer model in an environment of an electronic device (such as an operating system or a virtual machine on the electronic device).

Needs

The EMM of a virtual representation may be based at least in part on a set of needs. A 'need' may reflect a demand of the virtual representation, e.g., for resources (such as food and water), for rest, for social interaction, for status, etc. A given need may have a target value (or saturation) and a dynamic deviation from the target value. Moreover, the given need may have a relative strength, which may determine its importance relative to other needs. For example, as a deviation from the target value and a strength of the given need increase, the signal to satisfy the given need increases (which is sometimes referred to as an 'urge'). Note that as the time that is available to satisfy the given need decreases, the signal to attend to it increases (which is sometimes referred to as 'urgency'). Furthermore, urge and urgency signals may be used to select content from memory and perception, modulate cognition, regulate physiological parameters, and/or inform decision-making. They may also make certain behaviors (such as flight, fight, orientation, and/or planning) more or less likely to occur.

Needs may be categorized as physiological, social (e.g., one or more relationships with others), and/or cognitive. For example, physiological needs may include: food (which is satisfied by eating), water (which is satisfied by drinking, and frustrated by prolonged sweating), physical integrity, health or pain avoidance (which is frustrated by injury), rest (which is satisfied by relaxation, and frustrated by exercise), safety/security (which is satisfied by protection, and frustrated by attack), Hedonic well-being, libido, and/or another physiological need or its virtual equivalent. Note that a food or water need is sometimes referred to as 'sustenance.' Moreover, social needs may include: affiliation or belonging to a social group (which is satisfied by acceptance, and frustrated by exclusion), status (which is satisfied by approval, and frustrated by disapproval, and which relates to group norms), legitimacy (which is satisfied by self-approval, and frustrated by self-disapproval, and which relates to internalized norms or 'honor,' e.g., conforming to your own purpose and norms), nurturing or compassion (which is satisfied by nurturing, and frustrated by empathetic pain, e.g., helping others, reduce suffering, etc.), romantic affect or affection (which is satisfied by intimacy, and frustrated by rejection), dominance (which is satisfied by dominating, leading or otherwise controlling others), and/or another social need or its virtual equivalent. Furthermore, cognitive needs may include: competence (which is satisfied by success, and frustrated by failure, and which may be separated into task specific or epistemic and general competence, e.g., becoming skillful, achieving goals, etc.), exploration or curiosity (which is satisfied by novelty, and frustrated by repetition), certainty (which is satisfied by confirmation, e.g., reducing uncertainty, and frustrated by disconfirmation), aesthetic enjoyment (which is satisfied by enjoyment, and frustrated by disgust, and which may be separated in stimulus specific aesthetics, e.g., an experience of intrinsically pleasant stimulus, and abstract aesthetics or beauty of representation, such as discovery of structure), and/or another cognitive need or its virtual equivalent.

Figure 4:
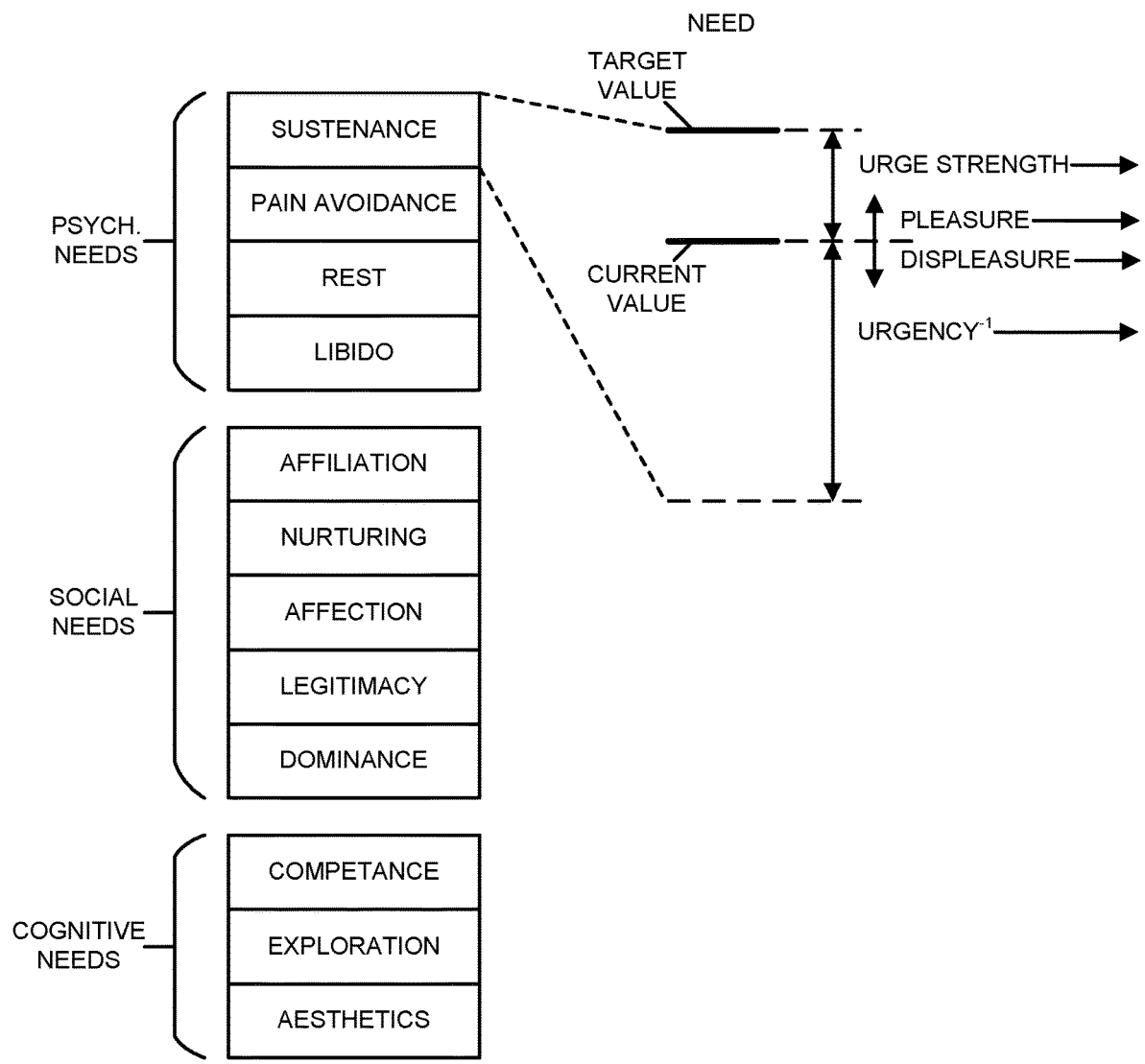
FIG. 4 is a drawing illustrating an example of needs and urges in a dynamic emotion and motivation model (EMM) in accordance with an embodiment of the present disclosure.

FIG. 4 presents a drawing illustrating an example of needs and urges in the dynamic EMM in accordance with an embodiment of the present disclosure. Note that the EMM may include additional or fewer needs based at least in part on the desired scope of behaviors of the virtual representation.

Moreover, the given need may be satisfied (e.g., the deviation from the target value decreases) or frustrated (e.g., the deviation from the target value increases). These events (such as in an environment of the virtual representation, e.g., in a video game) are sometimes referred to as 'consumptions.' A consumption may have an amount, a duration, and a distribution that specifies how the amount is consumed during the duration.

The satisfaction of the given need may produce a pleasure signal (e.g., having a positive value) that is proportional to the strength of the need, the pleasure sensitivity of the virtual representation at the current time (which may relate to the attention or attentional focus of the virtual representation), and the amount of satisfaction per unit of time. Similarly, a displeasure signal (e.g., having a negative value) may be produced by the frustration of the given need.

Furthermore, the given need may be replenished over time. Notably, the decay of the given need may be a function (such as a predefined or variable closed-form expression, a cubic spline, a look-up table, etc.) that specifies how much the deviation from the target value increases over time (in the absence of one or more consumptions). Pleasure and pain signals may be used as reward signals to learn new representations and behaviors, to modify existing ones, and/or to modify behavior.

In some embodiments, the given need may be model as a differential amplifier with a target value and the current value as inputs, a gain corresponding to the relative importance or strength (which may be individual specific), and an urge or urgency as the output. The output of the differential amplifier may be filtered, e.g., in order to model decay. Moreover, a pleasure signal or a pain signal may correspond to a time derivative of the urge or urgency. As described further below, in the dynamic EMM, needs may, at least in part, determine or specify personality of the virtual representation.

Modulators

The dynamic EMM may also include modulators. Modulators are parameters that control how cognition and perception are performed. Notably, in the dynamic EMM, modulators may control the use of resources, e.g., cognitive, perceptual and/or physiological resources. A given modulator may have a baseline (e.g., its default state), a range over which the given modulator may vary (such as upper or maximum and lower or minimum values), a volatility (such as a sensitivity to change, e.g., how hard it is to reach the upper value or the lower value of the range), and/or a release time or decay (which may specify how long it takes for the given modulator to return to the baseline state). For example, the modulators may include: arousal (which may relate to an action tendency of a virtual representation, an intensity of movement and metabolism, and/or an intensity of expression), dominance (e.g., an active versus a passive role or behavior), valence (a weighted combination of pleasure and pain signals in the current context, which may provide a situational evaluation, such as good or bad, or happy or unhappy), a selection threshold (which may indicate or correspond to a stability of a current motive of the virtual representation), aggression (a tendency for aggressive versus peaceful behavior by the virtual representation), a resolution level (such as a depth and resolution of perception or cognitive operations), a stubbornness parameter, a suppression parameter, an attention or attentional focus (e.g., to an object, an external world or environment, self, i.e., the virtual representation, and/or one or more cognitive operations), and/or another modulator. Moreover, a need for competence may act as a modulator for retreat or approach, and/or a modulator may, at least in part, determine a temperament of the virtual representation. Note that a configuration of modulators is sometimes referred to as an 'affective state,' and the set of all configurations is sometimes referred to as the 'affective space.' In some embodiments, the dynamic EMM may include additional or fewer modulators to enhance of modify the dynamic EMM.

Figure 5:
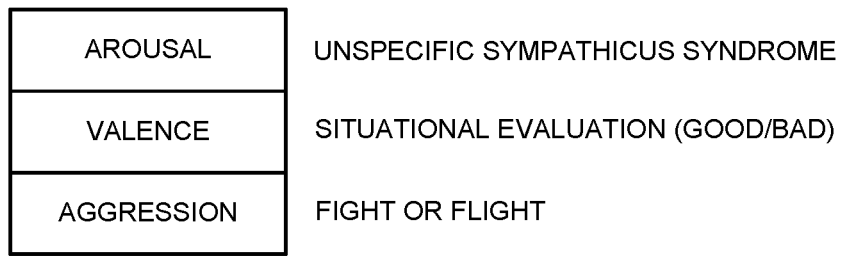
FIG. 5 is a drawing illustrating an example of modulators in a dynamic EMM in accordance with an embodiment of the present disclosure.
Figure 5:
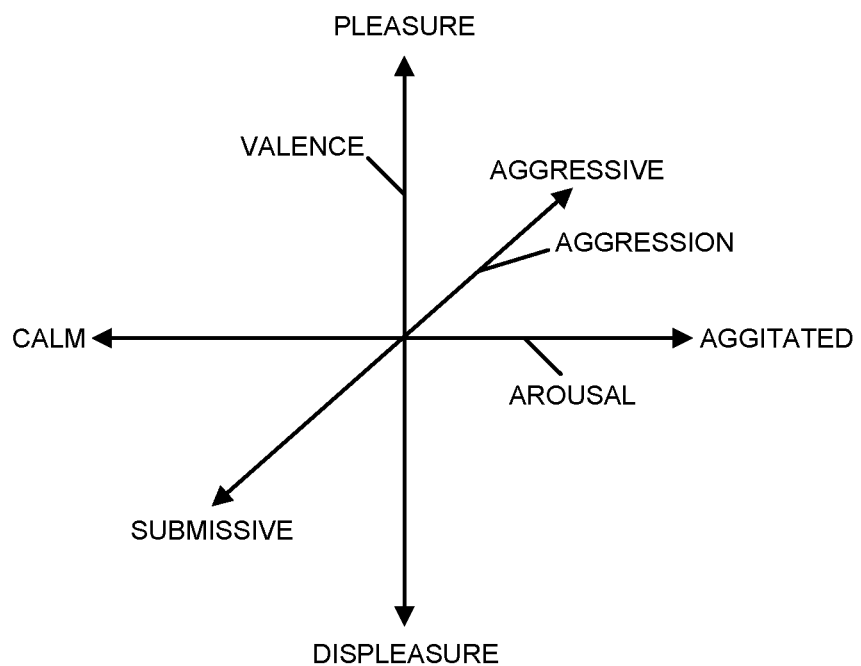
Figure 6:
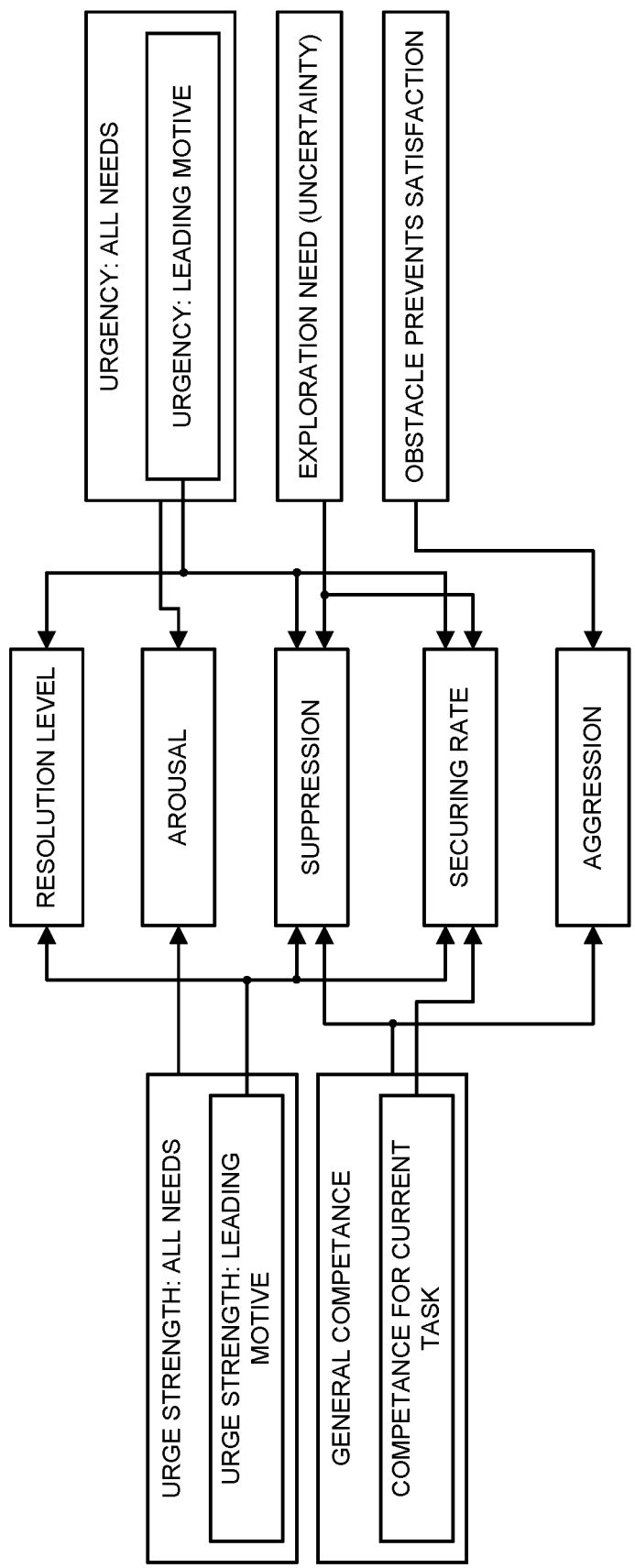
FIG. 6 is a drawing illustrating an example of modulator dynamics in a dynamic EMM in accordance with an embodiment of the present disclosure.

FIG. 5 presents a drawing illustrating an example of modulators in a dynamic EMM in accordance with an embodiment of the present disclosure. Moreover, FIG. 6 presents a drawing illustrating an example of modulator dynamics in a dynamic EMM in accordance with an embodiment of the present disclosure.

Attention

In the dynamic EMM, attention or attentional focus may provide a control system in which the attentional focus may dynamically select the evaluation of features for or related to one or more tasks (such as one or more cognitive-reasoning and/or perceptional tasks) based at least in part on one or more criteria.

Attention may play several roles in the dynamic EMM. Notably, attention may, at least in part, determine a direction of perception and cognition. For example, the object of perception and cognition may be: an orientation (such as the establishment of a perceptual or cognitive context, e.g., an external or imagined scene), the exploration of an object (perceptual or imagined), and/or the management of cognitive resources (or metacognition). The direction of attention may be regulated by: an exteroception/interoception modulator (which determines the sensitivity of a virtual representation to one or more stimuli originating outside of/inside of the 'body' of the virtual representation), the object of attention by a focus modulator (which may specify an attentional breadth), and/or the perceptual/cognitive process itself (as discussed below in the discussion of tracking of identity).

The direction of attention may, at least in part, be expressed by or indicated by the gaze direction and/or the gaze pattern of the virtual representation. For example, during exteroception, the virtual representation may scan an external world or environment (which is sometimes referred to as 'orientation') or may fixate on an object. Alternatively, during interoception, the virtual representation may defocus its gaze from external objects, avoid looking at distracting stimuli and/or may direct their gaze to a specific corner of the visual field while retrieving memories or constructing mental scenes. Thus, attention may be used to control cognition and/or memory.

Moreover, attention may, at least in part, determine the allocation of perceptual and cognitive resources (such as a width and/or depth). For example, a resolution-level modulator may regulate a depth of perception and cognition (which may result in higher amounts of retrieved detail and resolution, at the cost of slower processing and reaction times). A focus operator may regulate a width of perception, e.g., whether attention is integrating over many objects/features or just a single object/feature.

Furthermore, attention may, at least in part, determine tracking of identity. Notably, during cognitive and perceptual operations, it may be often necessary to follow the trajectory of an object through a visual scene or a sequence of cognitive operations. In this sense, attention may act as one or more pointers that are continuously following the representation of an object. This object may also be a need of the virtual representation, an urge that signals an intensity of the need, a pleasure/pain signal, and/or an expectation. Note that an object that is held in the attentional focus may tend to or may result in a stronger appraisal (which is a reaction to evaluating the valence of the object). This approach may be used in machine learning, e.g., in a transformer architecture.

Additionally, attention may be used in attentional learning. Notably, one or more attended objects and one or more working memory configurations may be stored in an indexed memory for subsequent retrieval. If the virtual representation has a model of its own behaviors and their consequences, it may: store tentative changes to these behaviors and their expected outcome in memory, perform the changed behavior, wait for the outcome of the situation (which can happen at a much later time), and/or evaluate it using the memory and stored expectations. Consequently, the change may be reinforced or rolled back.

Attentional learning typically requires that the virtual representation has a model of its own architecture, e.g., it needs to know which changes are affected by which behaviors, how the behaviors can be addressed, and how these behaviors are represented and parameterized. This may be done by training the attentional system itself, using the same procedure. Using the attentional system on itself may lead to or may result in memories of having used the attentional system (which is sometimes referred to as 'reflexive attention'). Reflexive attention, or attention to the attentional system itself, may provide the functional equivalent of consciousness to the virtual representation. Note that reflexive attention may allow the virtual representation to keep certain types of features stable, which may enable learning. For example, reflexive attention may allow the virtual representation to reason about things that it cannot see or measure directly, such as emotions or constructs. In some embodiments, conscious can be modelled as a weighted summation of layered models in the dynamic EMM.

In some embodiments, attention may be used in reasoning. Notably, if the behaviors affected by attentional learning are cognitive (such as mental operations) and the outcome is immediately available as a mental construct, then attentional learning may happen or occur in real time. In this way, the attentional system may construct and correct mental representations. This process can be understood as the functional equivalent of reasoning.

Figure 7:
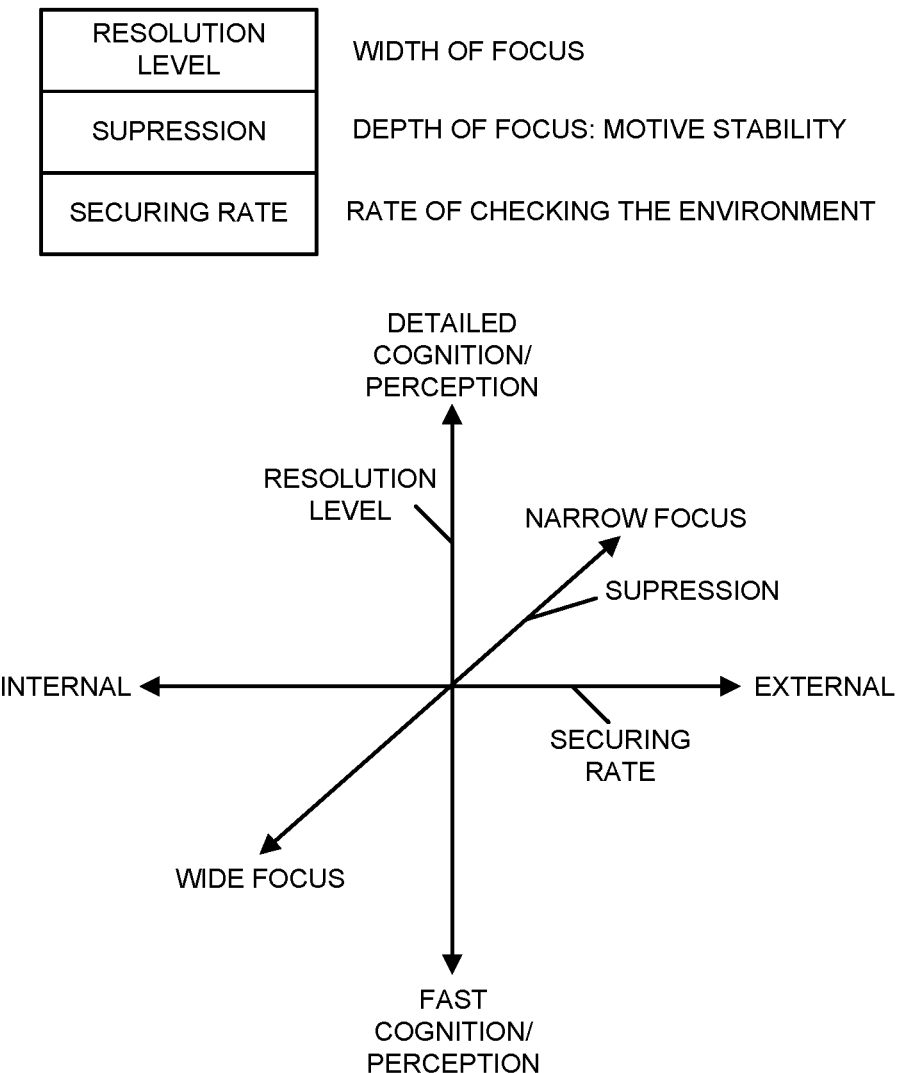
FIG. 7 is a drawing illustrating an example of attentional modulators in a dynamic EMM in accordance with an embodiment of the present disclosure.

Note that attention may drive the valence and the behavioral response of the virtual representation. FIG. 7 presents a drawing illustrating an example of attentional modulators in a dynamic EMM in accordance with an embodiment of the present disclosure.

Anticipation

While consumptions may provide immediate feedback about the performance of a virtual representation (e.g., via particular pleasure or pain signals, and/or a change in an urge), actual behavior may, at least in part, be controlled by anticipated events (such as expected reward and/or one or more models of future pleasure, pain and need changes, which usually may be in the context of one or more future consumptions).

In the dynamic EMM, anticipating a future consumption (or satisfaction or frustration of a given need) may result in a change in expected reward, which may be reflected as in an imaginary pain signal or an imaginary pleasure signal. Similarly, a change in expectation (e.g., because an anticipated consumption is no longer possible) may result in an imaginary pain signal or an imaginary pleasure signal, and the satisfaction or frustration of the needs for competence (via failure or success consumptions) and/or certainty (via confirmation or disconfirmation consumptions).

The evaluation of an anticipated or hypothetical sequence of events (a possible future of the virtual representation, or a remembered past) may result in a change in the motivational configuration and/or emotional configuration of the virtual representation. This change of valence and expectations caused by an actual or anticipated event or series of events is sometimes referred to as an 'appraisal.'

Feelings

In the dynamic EMM, changes in modulators (such as arousal) may result in a change in the regulation of physiological processes or their virtual equivalents (such as digestion, blood flow to the extremities, a breathing rate, etc.), which in turn may be sensed as somatic correlates of an emotional or motivational state. This may include the sense of flushing during shame, or the sense of increased muscular tension during fear.

The anticipation or actual frustration and satisfaction of needs may also result in specific classes of physiological sensations of pleasure, pain, expansion, constriction, relaxation and tension, which manifest in different areas of the body (or its virtual equivalent), without involving actual activity in the nervous system of the body. These sensations may help make appraisals distinct and salient to a virtual representation by projecting them into a body map (e.g., a predefined look-up table that relates emotional, mental and/or computational processes to particular anatomical functions or regions, or their virtual equivalents). For example, there may be sensations of constriction and pain in the stomach and pelvic region during anxiety (as a result of an appraisal of endangered safety and insufficient competence to deal with future situations), or of pleasure and expansion in the chest region when satisfying affiliation or romantic affect. In some embodiments, feelings may be represented by real-valued numbers in a hyperdimensional space, which can be mapped into the 'body' (which is sometimes referred to as a 'synesthesia').

Therefore, in the dynamic EMM, feelings may be perceptual sensations associated with projecting emotions into a body map. Note that feelings may contribute to a distinctive experience, semantic content and/or expression of emotional and/or motivational states.

Behavioral Tendencies

Different configurations of the dynamic EMM (which may include different sets of parameters) may increase or decrease the probability of behavioral tendencies. The behavioral tendencies may include: orientation, aggression, flight, avoidance, interest, and/or another behavioral tendency. Orientation may include establishing of a situational context, which may be correlated with a failure to confirm expectations and low certainty about an environmental state. Moreover, aggression may include sanctioning behavior or destruction of an opponent, which may be correlated with negative valence and high general competence. For example, aggression may occur in a situation where another virtual representation violates norms or presents or manifestly prevented the realization of a motivationally relevant goal. Furthermore, flight may include a retreat from a situation in order to preserve safety or to avoid physical or emotional harm, which may be correlated with negative valence and low specific competence. Additionally, avoidance may include disengagement from an object or a situation in anticipation of negative consequences from interaction. Interest may include engagement with an object or a situation in anticipation of positive consequences.

Decision-Making

Urge, urgency, anticipated reward (or changes in needs due to consumptions) and/or task-specific competence may influence the decision-making of a virtual representation. In some embodiments, decision-making based at least in part on the dynamic EMM may include, for a given need, determining the urge to satisfy it, constrained by the urgency, and weighting the urge with: the expected probability of satisfying the urge in the present environment (epistemic competence), the expected reward(s) (which may not be higher than the deviation of the given need from its target value), and/or the expected cost/risk (which may include an opportunity cost, an expense in terms of consumed resources, and/or one or more costs associated with one or more aversive events).

The expected reward may be computed by constructing a plan to satisfy the corresponding need. First, the dynamic EMM may check if there is a way to satisfy the need opportunistically, e.g., without a change in present plans. If there is no way to satisfy the need opportunistically, the dynamic EMM may try to identify an automatism (e.g., a known sequence of actions that leads from the present situation to a consumption event). If there is no suitable automatism, the dynamic EMM may try to construct such a sequence. If an automatism cannot be constructed, the dynamic EMM may then try to obtain a general estimate to find such a sequence via further exploration of the environment. Note that the expected reward may be the estimated reward of the consumption itself, minus the cost/risk of obtaining it, multiplied with the expected probability of obtaining the consumption.

If the expected reward is higher than the expected reward of the current leading motive, the corresponding consumption (which may be based at least in part on one or more urges/drives corresponding to one or more needs) may become a goal of the dynamic EMM, and together with the plan to reach it, the new leading motive. A given goal may attempt to satisfy a particular demand (which may be hard-wired or fixed). While the goals may be flexible, they may result in (from an evolutionary perspective) a suitable behavior. Note that a leading motive is sometimes referred to as an 'intention.' In order to avoid oscillations, the current leading motive may receive a weight bonus (e.g., the selection threshold), which may be added to the current leading motive before comparing it to a competing motive.

Figure 8:
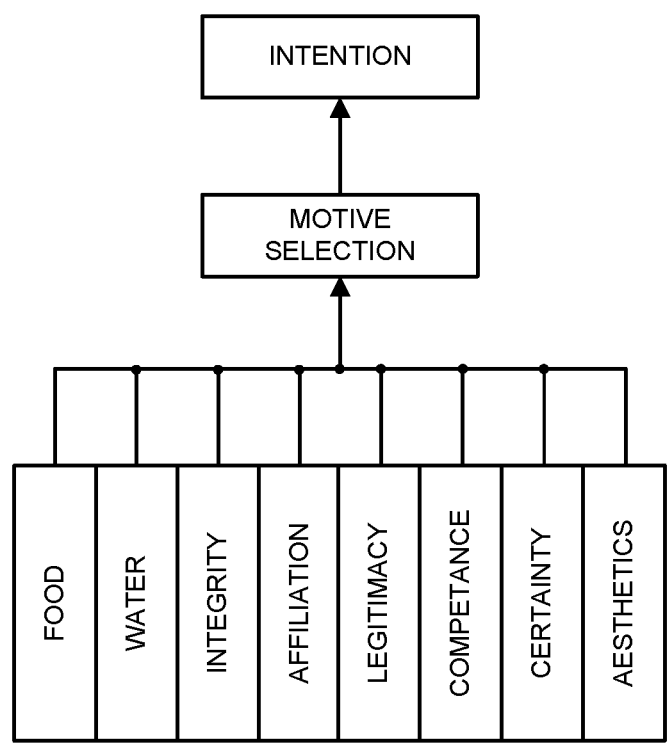
FIG. 8 is a drawing illustrating an example of a motivational system in a dynamic EMM in accordance with an embodiment of the present disclosure.
Figure 9:
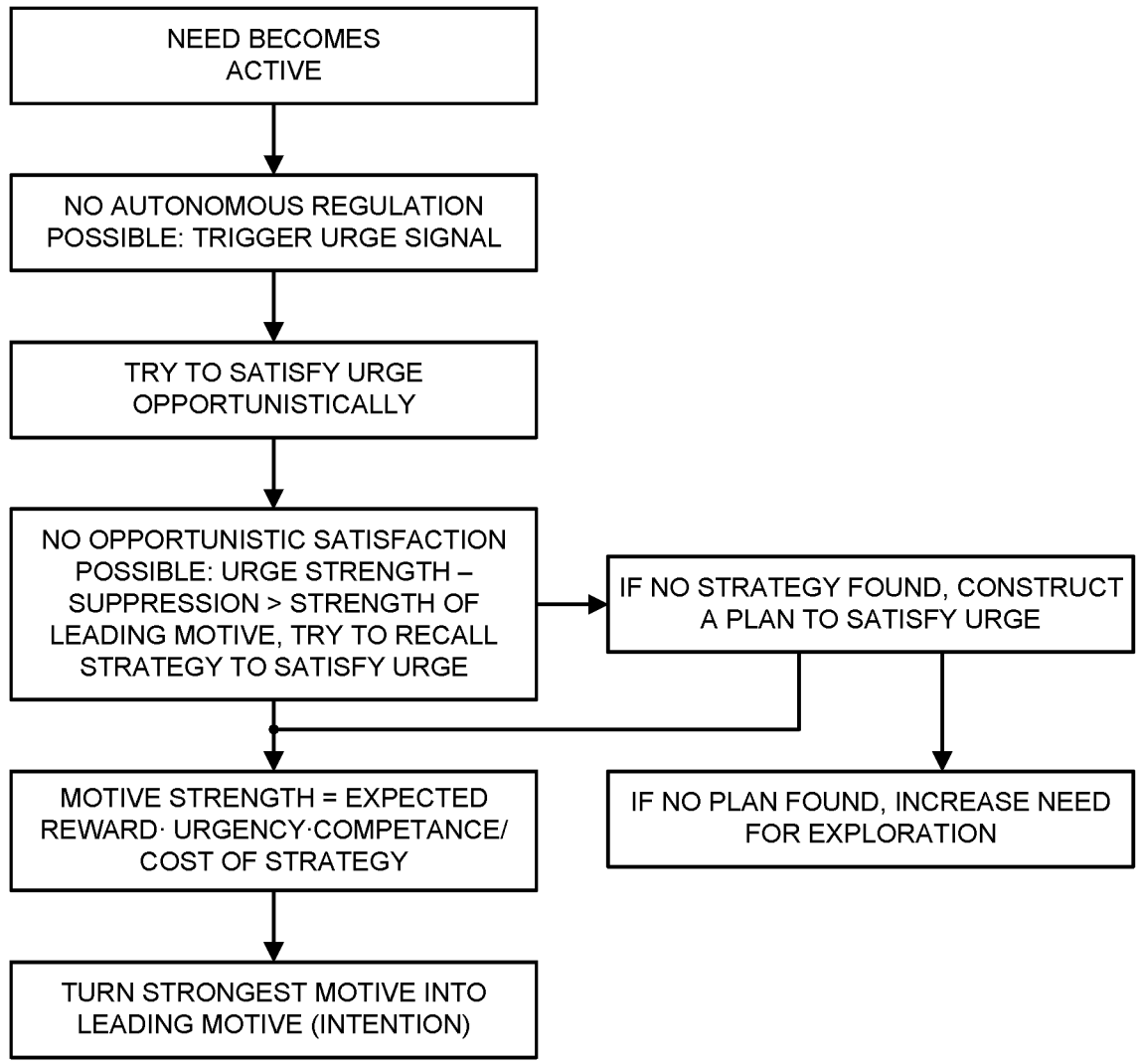
FIG. 9 is a drawing illustrating an example of a motivation selection in a dynamic EMM in accordance with an embodiment of the present disclosure.

FIG. 8 presents a drawing illustrating an example of a motivational system in the dynamic EMM in accordance with an embodiment of the present disclosure. Moreover, FIG. 9 presents a drawing illustrating an example of a motivation selection in the dynamic EMM in accordance with an embodiment of the present disclosure.

Expression

Emotional and/or motivational states may be expressed via: behavior (as discussed previously for behavioral tendencies), utterances (such as speech, gestures and/or facial emblems or symbolic gestures), voluntary and involuntary facial expression, dynamics of facial expression, posture, dynamics of movement, gaze direction and the dynamics of gaze (such as a gaze pattern), blinking frequency, flushing of the skin, breathing patterns, heart rate and/or muscular tension. One or more of these emotional and/or motivational states may be inputs to the dynamic EMM (such as one or more of the sensory inputs) and/or may be outputs from the dynamic EMM (a behavioral or emotion response of the virtual representation).

Moreover, additional correlates of emotional and/or motivational states may be captured or measured and provided as one of the sensory inputs, such as: skin conductance, blood flow to extremities, face, torso and/or sexual organs, muscular tension, an EEG (which measures changes in the electromagnetic field generated by cortical activity), functional magnetic resonance imaging or FMRI (which measures changes in blood flow in the brain due to metabolic activity), etc. For example, using one or more cameras and an image-processing technique, measurements may be performed of the user's: heart rate, facial expression, gaze direction, gaze pattern, changes in blood flow in exposed skin, posture and/or movement patterns. Similarly, when one or more of the additional correlates of emotional and/or motivational states are an output from the dynamic EMM, the virtual representation may include or may mimic the relevant additional correlates.

Because these expressions are often a result of functional mechanisms that have their origin in emotional and/or motivational states, it may be possible to infer constraints on the internal states of a user or a virtual representation by observing their expressions. In combination with sematic information about the interaction context, a history of expressions and/or general dynamics of expression by other users or other virtual representations, future expression may be predicted. Moreover, using this information, it may also be possible to make inferences that allow reconstruction of a detailed model of the present motivational and/or emotional state of the user or the virtual representation, including their needs, intentions, appraisals and/or cognitive processes.

Facial Expression

Facial expression may be understood as a superposition of the pose of the face (the direction of the face in six dimensions), a gaze direction, blood flow through the skin, a configuration of the facial muscles, and/or the changes in these states over time. In some embodiments, the configuration of facial muscles may be approximated using facial action codes (FACs). These codes may correspond to the way in which individual motor neuron fibers can address the different muscle groups of the face. FACs may be understood as principal components of a facial configuration, and may be extended by including additional components, and retraining the resulting model using a suitable labeled dataset.

Alternatively, instead of using FACs, facial expression may be modeled using blend shapes, which may correspond to prototypical expressions (such as surprise, fear, disgust, contempt, happiness, sadness, anger, etc.) or components of such expressions. A desired facial expression may be obtained by interpolating between different prototypical expressions along latent dimensions of the underlying affective space.

Facial expressions may be composed from voluntary and involuntary movements. Voluntary movements may mask, modify or qualify an involuntary facial expression. Moreover, in general, voluntary movements may take longer to generate, because of the additional number of required cognitive processing operations, and may differ in timing and muscular control from involuntary ones. The facial expression during the interval between the onset of an involuntary facial expression and its voluntary modification is sometimes referred to as a 'micro-expression,' and may reveal additional information about the state of a user or a virtual representation.

In some embodiments, facial expressions may be approximated or composed from, and interpreted as corresponding to or indicating, one or more components, including: raised eyebrows (questioning/orientation); narrowing of the inner corners of the eyebrows (worry and/or pain); a narrowly pinched mouth or a wide, tense mouth (pain); lowering of eyebrows (determination, especially during aggression or disapproval); a set jaw (determination); slack face and jaw (loss of context); wide open eyes (a need for visual orientation); high tension of facial muscles (bracing for danger); lifting of cheeks (pleasure); lowered corners of the mouth (a sadness emblem); raised corners of the mouth (a happiness emblem); and/or a raised nose with flared nostrils (disgust). While these facial expressions vary considerably in different individuals and within the same individual across contexts, they may be used as a first approximation in character animation, and/or as initial conditions for a more-detailed and automatically learned model of facial expression.

Emotions

In the dynamic EMM model, an emotion may be understood as a specific configuration of: urges, urgencies, pain and pleasure signals, anticipations, changes in anticipation, attentional focus and cognitive modulators, somatic feelings, expression and/or semantic content (e.g., a specific instance or class of motivationally relevant situations upon which the emotion is directed). Emotional modeling may involve one or more parameters: intero-extero reception (use to specify whether a virtual representation takes in stimuli originating outside of/inside of or internal to the 'body'; a width of focus (such as deep/narrow versus a broad width); openness (such as whether a virtual representation is open to intimacy if there is a shared purpose); dominance (such as submission versus superiority, which may be a function of self-esteem, e.g., based at least in part on a social graph); resolution level (which may specify a depth of perception); and/or arousal.

Note that many emotions may be understood as emergent configurations over continuous-valued parameters of a motivational and modular system, such as: certainty, arousal, and/or valence. Continuous changes in these parameters may correspond to continuous changes in facial expression.

Moreover, emotion categories may depend on language and cultural context, while the underlying states may not have such a dependence. Therefore, emotions may be understood as labels, while the underlying states may be features. The relationship between the labels and the sets of features may be established by conceptual analysis, data collection from human subjects, and/or machine learning. Table 1 provides an example of the association of emotions and the underlying states (features) of these emotions.

TABLE 1

| Emotion | Valence | Arousal | Dominance | Competence | Certainty |
| --- | --- | --- | --- | --- | --- |
| Admiration | Positive | | | | High |
| Adoration | Positive | | | | High |
| Aesthetic Appreciation | Positive | Mostly Low | | | |
| Joy | Positive | High | | | |
| Amusement | Positive | Low to High | | High | Low |
| Annoyance | Negative | Low to High | | | |
| Anger | Negative | Mostly High | Active | High | |
| Anticipation | Positive | | Passive | | |
| Anxiety | Negative | | Passive | | Low |
| Apprehension | Negative | Mostly Low | | | |
| Approval | Positive | | Active | | |
| Awe | Positive | | Passive | | |
| Awkwardness | Negative | Mostly Low | Passive | | Low |
| Bliss | Positive | Low | Passive | | |

TABLE 1-continued

| Emotion | Valence | Arousal | Dominance | Competence | Certainty |
|---|---|---|---|---|---|
| Boredom | Negative | | Active | | High |
| Calmness | Positive | Low | | | |
| Certainty | Positive | Mostly Low | | | High |
| Confidence | Negative | Mostly Low | Active | High | |
| Confusion | Negative | Mostly Low | | | Low |
| Contempt | Negative | Mostly High | Active | | |
| Craving | Negative | Mostly High | Active | | |
| Despair | Negative | Mostly High | | | High |
| Determination | Positive | | Active | High | High |
| Disappointment | Negative | Mostly Low | | | High |
| Disapproval | Negative | | | High | High |
| Dread | Negative | | | | |
| Disgust | Negative | | Active | | |
| Eloquence | Positive | | Active | High | |

| Emotion | Object | Need | Property | Behavior |
|---|---|---|---|---|
| Admiration | Other | Legitimacy | Higher Esteem Than Self | Signaling |
| Adoration | Other | Sensual Aesthetics | Enjoyment | Perception, Signaling |
| Aesthetic Appreciation | | Structural Aesthetics | | Perception, Cognition |
| Joy | | Any Appetence | Experience of Pleasure | |
| Amusement | | Structural Aesthetics | Aesthetic Pleasure with Expectation Violation | Signaling |
| Annoyance | | Aesthetics | Violation of Aesthetic Standards | Signaling |
| Anger | Other | Mostly Competence | Has Prevented Reaching Goal | Fight |
| Anticipation | Future Situation | Any Appetence | | Cognition |
| Anxiety | Future Situation | Certainty, Competence | Coping Inability | Cognition |
| Apprehension | Future Situation | Any Aversion | Possible Coping Inability | Cognition |
| Approval | Other | Legitimacy | Violation of Legitimacy Standards | Signaling |
| Awe | | Structural Aesthetics, Competence, Legitimacy | Appreciation Saturation Event | Entrancement |
| Awkwardness | Self-Other | Status, Competence | Lack of Competence Leading to Status Loss | Retreat |
| Bliss | | Sensual Aesthetics | Strong Sensual Pleasure with Low Arousal | Entrancement |
| Boredom | | Certainty | Avoid Repeated Exploration Without Payoff | Avoidance |
| Calmness | | [Arousal Modulator] | Coping Ability | |
| Certainty | | Certainty | | |
| Confidence | | Competence, Certainty | Coping Ability | Signaling |
| Confusion | | Certainty | Inability to Form Model | Orientation |
| Contempt | Other | Legitimacy | Norm Violation, Low Esteem | Signaling |
| Craving | | Any Appetence | Strong Urge | Seeking |
| Despair | Immediate or Future Situation | | No Coping, Anticipating Destruction | Signaling |
| Determination | | Competence, Certainty | Certainty About Own Decision, Urge to Act | |

| Emotion | Valence | Arousal | Dominance | Competence | Certainty |
|---|---|---|---|---|---|
| Empathetic Pain | Negative | | | | |
| Empathetic Pleasure | Positive | | | | |
| Embarrassment | Negative | Mostly Low | | Low | |
| Entrancement | Positive | Mostly Low | Passive | | |
| Envy | Negative | Mostly Low | Active | | High |
| Excitement | Positive | High | | | |
| Exaltation | Positive | | | | |
| Fear | Negative | Mostly High | | Low | High |
| Glee | Positive | High | Active | High | High |
| Gloating | Positive | Mostly High | Active | High | High |
| Grief | Negative | Mostly High | | Low | High |
| Guilt | Negative | Mostly High | | | High |
| Hate | Negative | Mostly High | | | High |
| Horror | Negative | Very High | | | High |
| Hope | Positive | | | Low | Low |
| Humor | Positive | High | | | |
| Indecision | Negative | Low | Passive | | Low |
| Interest | Positive | | Active | | |
| Jealousy | Negative | | | | |

TABLE 1-continued

| Emotion | Valence | Arousal | Dominance | Competence | Certainty |
|---|---|---|---|---|---|
| Love | Positive | | | | High |
| Longing | Negative | Mostly Low | Passive | Low | |
| Lust | Positive | High | | | |
| Melancholia | Negative | Low | Passive | Low | |
| Nostalgia | Positive | Low | Passive | Low | |
| Pain | Negative | | | | |
| Panic | Negative | Very High | Active | Low | |
| Pleasure | Positive | | | | |
| Pity | Negative | | | High | |

| Emotion | Object | Need | Property | Behavior |
|---|---|---|---|---|
| Disappointment | Change in Expectation | Competence, Certainty | | |
| Disapproval | Other | Legitimacy | Norm Violation of Other | Signaling |
| Dread | | Safety | Inability to Cope with Present World | Cognition |
| Disgust | | Sensual Aesthetics | Avoiding infection/ingestion | Avoidance, Signaling |
| Eloquence | Self | Competence, Status | Anticipating Status Success | Signaling |
| Empathetic Pain | Other | Nurturing | | Perception |
| Empathetic Pleasure | Other | Nurturing | | Perception |
| Embarrassment | Self-Other | Status | Loss of Public Esteem | Avoidance, Signaling |
| Entrancement | Situation | Aesthetics | | Entrancement |
| Envy | Self-Other | Status | | Fight, Cognition |
| Excitement | | Competence | High Arousal Activity While Anticipating Success | |
| Exaltation | Self | Legitimacy | High Self Legitimacy | Entrancement |
| Fear | Self-Other | Safety, Certainty, Competence | | Avoidance, Flight |
| Glee | Other | Competence, Status | Appreciation of Bad Outcome for Other | Signaling |
| Gloating | Other | Status, Competence | Low Esteem Agent Loses Status | Signaling |
| Grief | Self-Other, Past | Affiliation, Romantic Affect | Permanent Loss of Satisfaction | Signaling, Retreat |
| Guilt | Self-Other | Legitimacy | Own Norm Violation Leads to Bad Outcome for Others | Signaling, Retreat |
| Hate | Other | Legitimacy | | Fight |
| Horror | | Safety | | Fight, Avoidance |
| Hope | Future Situation | Any Appetence | | Cognition |
| Humor | | Sensual Aesthetics | Paradoxical Expectation Violation | |
| Indecision | | Competence | | Orientation |
| Interest | | | Appearance for Uncertainty Reduction | Perception |

| Emotion | Valence | Arousal | Dominance | Competence | Certainty |
|---|---|---|---|---|---|
| Pride | Positive | Mostly High | | High | High |
| Rage | Negative | Very High | Passive | | |
| Regret | Negative | Mostly Low | Active | Low | High |
| Relief | Positive | | Passive | | High |
| Revulsion | Negative | Mostly High | Active | | High |
| Sadness | Negative | | Passive | Low | |
| Satisfaction | Negative | Low | | High | |
| Satiation | Positive | Low | | | |
| Sexual Arousal | Positive | High | | | |
| Shame | Negative | High | | | High |
| Shock | Negative | Very High | Passive | Low | Low |
| Startle | Negative | High | Passive | | Low |
| Surprise | Neutral | Mostly High | Passive | | Low |
| Sympathy | Positive | | Active | | |
| Triumph | Positive | High | Active | High | High |
| Uncertainty | Negative | Mostly Low | | | Low |

| Emotion | Object | Need | Property | Behavior |
|---|---|---|---|---|
| Jealousy | Self-Other | Romantic Affect, Competence | Anticipated Loss of Romantic Object | Fight |
| Love | Other | Nurturing, Affiliation, Legitimacy | | Seeking/Perception |
| Longing | Distant Situation | Any Appetence | Appetence for Presently Unavailable Gratification | Cognition/Perception |
| Lust | | Libido, Sensual Aesthetics | Experience of Libidinous Satisfaction | Entrancement |

TABLE 1-continued

| | | | | |
|---|---|---|---|---|
| Melancholia | | Sensual Aesthetics | | Cognition |
| Nostalgia | Past Situation | | Past Situation Holds More Satisfaction Than Future | Cognition |
| Pain | | Any Aversion | Experience of Present Need Increase | Signaling |
| Panic | Present of Immediate | Safety | Inability to Cope with Present Situation | Flight |
| Pleasure | | Any Appetence | Experience of Present Reward | |
| Pity | Other | Nurturing | Desire to Support Other | Support |
| Pride | Self | Status | Rise in Self Esteem | Signaling |
| Rage | | Legitimacy | Strong Violation of Legitimacy Standards | Fight, Signaling |
| Regret | Past Decision | Any Appetence | Past Decision Prevents Present Reward | Cognition |
| Relief | Change in Expectation | Any Aversion | Avoid Anticipated Aversive Event | Signaling |
| Revulsion | | Sensual Aesthetics | Strong Violation of Aesthetic Standards | Signaling, Avoidance |
| Sadness | | Competence | Help to Regain Satisfaction | Signaling, Retreat |
| Satisfaction | | Competence, Sensual Aesthetics | Fully Satiated a Need | |
| Satiation | | Any Appetence | | |
| Sexual Arousal | | Libido | | Seeking |
| Shame | Self-Other | Legitimacy | Loss of Esteem and Status | Submission, Avoidance |
| Shock | | Competence | Sudden Change That Exceeds Coping Ability | Interrupt |
| Startle | | Certainty | Sudden Grave Change in Environment | Interrupt |
| Surprise | | Certainty | Violation of Expectations | Orientation |
| Sympathy | Agent | Affiliation | Desire to be Affiliated with Particular Agent | |
| Triumph | Self-Other | Status | Experience of Good Outcome | Signaling |
| Uncertainty | | Certainty | | Orientation |

Parameters

In the dynamic EMM, needs, urges, rewards, modulators, expressions, etc. may be represented using parameters or sets of parameters. A given parameter may be continuous valued or a discrete variable. The values may be set explicitly (e.g., predefined) or may be changed in the course of a simulation using the dynamic EMM. In some embodiments, a simulation may occur stepwise, with a fixed or a variable frequency (such as the frame rate or resolution of the simulation). Alternatively, a simulation may occur analytically. In a given step or iteration in a simulation, values of one or more parameters may change based at least in part on the values of these parameters in one or more previous steps and/or on the values of one or more other parameters in the one or more previous steps, in the given step and/or due to events (such as during an interaction with a user, or in an environment, e.g., consumption events, or urgency or indicator events).

Note that an 'event' may be an object with a set of parameters and functions that change the values of other parameters, such as expectations of a virtual representation, the changes of its needs, etc. Events may also be triggered when the parameters of the dynamic EMM reach certain values, e.g., if one of the needs of the virtual representation is fully depleted or satisfied. Moreover, events may be scheduled for a particular timestamp, may be triggered at a particular timestamp, and/or may have a particular time duration. During a given event, one or more of the functions of the given event may be executed, e.g., to gradually release a reward to the virtual representation over a particular amount of time.

The dynamic EMM may define relationships between the parameters using computable functions (such as a continuous-valued function, a cubic spline, a look-up table, etc.). One or more of these functions may have an immediate effect in the dynamic EMM, which means that at least one parameter at time t in a simulation may be a function (such as a sum, a product, a weighted sum, a geometric mean, a maximum, etc.) of one or more other parameters at the same time. Moreover, a parameter at time t in a simulation may be a function of itself and/or one or more other parameters at a previous time step t−1, which may allow the function to describe a gradual decay of the parameter, the gradual approach to a target value, hysteresis, etc. Furthermore, a given function may be expressed as one or more systems of differential or difference equations, and may be translated into one or more computable functions before or during the simulation using the dynamic EMM.

Furthermore, the dynamic EMM may interface with other software components, modules or sets of program instructions (such as a facial animation engine) using one or more controllers. A given controller may include one or more computable functions that generate sequences of commands or instructions and parameters based at least in part on values of the dynamic EMM as a function of time during a simulation. Controllers may be used to decouple the dynamic EMM from the implementation of the virtual representation, and may, e.g., translate between the dynamic EMM and the virtual representation.

Table 2 provides an example of the set of parameters in the dynamic EMM and ranges of values for these parameters. The motivational properties of an agent are given by the collection of its needs (physiological, social and cognitive). Differences in the need parameters can be used to model different personalities. For example, a high weight and high gain parameter (corresponding to a sensitivity for reward) for the need for status, and a relatively lower weight for the need for affiliation can give rise to disagreeableness, while a high weight and high loss parameter (corresponding to a sensitivity to frustration) for the need for affiliation, and a relatively lower weight for the need for status can give rise to agreeableness. Moreover, a high weight and high loss parameter (corresponding to a sensitivity to frustration) on the need for competence can give rise to conscientiousness.

TABLE 2

| Need Parameter | Range |
| --- | --- |
| Type | Physiological, Social, or Cognitive |
| Current Value | {0 to 1} |
| Initialization Value | {0 to 1} |
| Current Urge Strength | {0 to 1} |
| Current Urgency | {0 to 1} |
| Current Pleasure | {0 to 1} |
| Current Pain | {0 to 1} |
| Weight | {0 to ∞} |
| Decay Time | {−1 to 1} |
| Gain | {0 to 1} |
| Loss | {0 to 1} |
| Imaginary Satisfaction | {0 to 1} |
| Imaginary Frustration | {0 to 1} |
| Pleasure Sensitivity | {0 to ∞} |
| Pain Sensitivity | {0 to ∞} |
| Pleasure Decay Time | {0 to ∞} |
| Pain Decay Time | {0 to ∞} |
| Imaginary Pleasure Sensitivity | {0 to 1} |

Note that the parameters underlying emotional states in the dynamic EMM may be interpreted as dimensions in a high-dimensional space, which may locally be either continuous-valued (for parameters such as the strength of urges or pleasure signals) or discrete (e.g., for parameters such as whether the object of a valenced reaction is self or other). Moreover, emotions that are valenced reactions to future events (such as anxiety, hope, or anticipation) are producing a modulation of valence, arousal, etc. in the absence of actual reward, just by attending to the object of these emotions. This may be modeled in the EMM using a parameter for imaginary satisfaction and imaginary frustration, and a parameter for imaginary pain sensitivity and imaginary pleasure sensitivity, which can take the form of a function of strength of attention, relevance, valence, certainty and/or an expected time of impact.

Dynamic EMM

The aforementioned systems may be integrated into a dynamic EMM, which may be inspired by or based at least in part on human behavioral and emotional processes. In the dynamic EMM, the basis set of emotions and modulators may be needs (which may be self-limiting, e.g., with decays), competition may be used to increase or maximize expected rewards, feedback may provide regulation.

Figure 10:
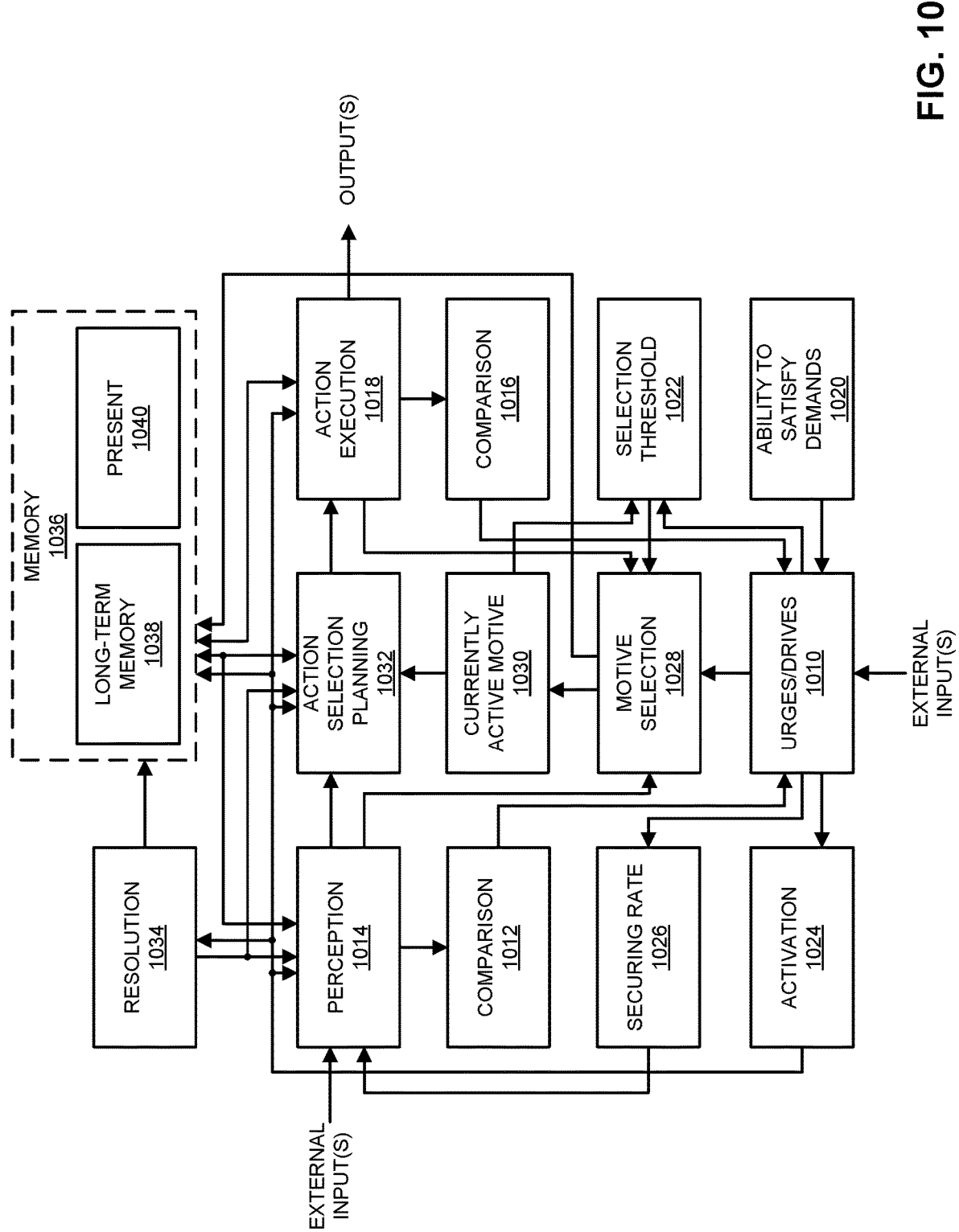
FIG. 10 is a drawing illustrating an example of a dynamic EMM in accordance with an embodiment of the present disclosure.

FIG. 10 presents a drawing illustrating an example of a dynamic EMM 1000 in accordance with an embodiment of the present disclosure. Notably, dynamic EMM 1000 may include urges/drives 1010 (such as: energy, water, integrity, affiliation, certainty, competence, etc.), where a given need may be specified by: a target value, a current value, a consumption, and/or relevance or strength. At least some of these urges/drives may be based at least in part on one or more demand sensors and/or one or more external inputs to dynamic EMM 1000 (such as one of more features associated with a user, one or more events, e.g., indicators or consumptions, etc.). Moreover, one or more of urges/drives 1010 may receive feedback from comparisons 1012 and 1016 to expectations from perception 1014 and action execution 1018, and/or from a measured ability to satisfy demands 1020. Furthermore, one or more of urges/drives 1010 may, at least in part, determine a selection threshold 1022, an arousal or activation 1024, and securing rate 1026. In some embodiments of dynamic EMM 1000, one or more modulators may include a configuration of physiology/cognition.

Motive selection 1028, which is involved in motive selection and decision-making, may select a currently active motive 1030 (i.e., may select a feature vector) based at least in part on one or more of urges/drives 1010, and the currently active motive 1030 may be input to action selection planning 1032 and/or memory 1036. Furthermore, the currently active motive 1030 may be modified by selection threshold 1022, and then may be feedback into motive selection 1028.

Activation 1024 may be input to or may impact perception 1014 (which may also receive one or more external inputs to dynamic EMM 1010), action selection planning 1032, action execution 1018, a resolution level 1034, and memory 1036. Note that memory 1036 may include a memory of a present 1038 and long-term memory 1040. Moreover, securing rate 1026 may be input to or may impact perception 1014. Furthermore, resolution level 1034 may be input to or may impact perception 1014, action selection planning 1032, and long-term memory 1040. Additionally, long-term memory 1040 may be selectively input to or may impact perception 1014, action selection planning 1032, and action execution 1018, and present 1036 may be selectively input to or may impact action selection planning 1032.

One or more outputs from perception 1014 (such as a feature vector) may be provided to motive selection 1028, present 1038 and/or to present 1038 or long-term memory 1040. Moreover, one or more outputs from action selection planning 1032 may be provided to action execution 1018 and/or to present 1038 or long-term memory 1040. Furthermore, one or more outputs from action execution 1018 may be an action (such as a behavioral or an emotional response of dynamic EMM 1010), and may be provided to present 1038 and/or motive selection 1028. Note that a behavior may include: cognition, an expression, and/or decision-making.

Precognitive regulation and decision-making in dynamic EMM 1000 may include or may involve one or more motives or intentions, as well as one or more purposes (such as one or more models of future rewards or needs). Dynamic EMM 1000 may regulate emotions (which may be principal components in a high-dimensional space). In the process, dynamic EMM 1000 may attempt to address the physiological, social and/or cognitive needs of the virtual representation. In some embodiments, the regulatory model may be dependent on a previous emotional state, as well as dynamics that pull emotions back to baseline values and sensory inputs that drive change. Note that a hierarchy of the purposes in dynamic EMM 1000 may correspond to or may reflect a personality of a virtual representation.

In some embodiments, dynamic EMM 1000 may include emotional perceptions, such as one or more appraisals (which include a situation mode, and which may be subconscious or precognitive). For example, the capability may allow an event to be assessed, such as: Is it a danger? This appraisal may result in an immediate behavior (such as a facial expression). The underlying processes in dynamic EMM 1000 may be state-driven, but long-lived and temporal, with feedback that is gradual (e.g., it may be integrated). In dynamic EMM 1000, the perception system may tell the cognitive system what is going on in terms of emotional relevance. Note that the perception system may attempt to find or establish coherence (e.g., a unified model), while the cognitive system may, at least to some degree or extent, apply logic.

Dynamic EMM 1000 may be constrained by the environment that contains it, e.g., by what makes sense. Moreover, outputs from or changes in dynamic EMM 1000 may be integrated (such as systematic underrelaxation) in order to prevent oscillations, which may help ensure that dynamics converge or are bounded.

Figure 11:
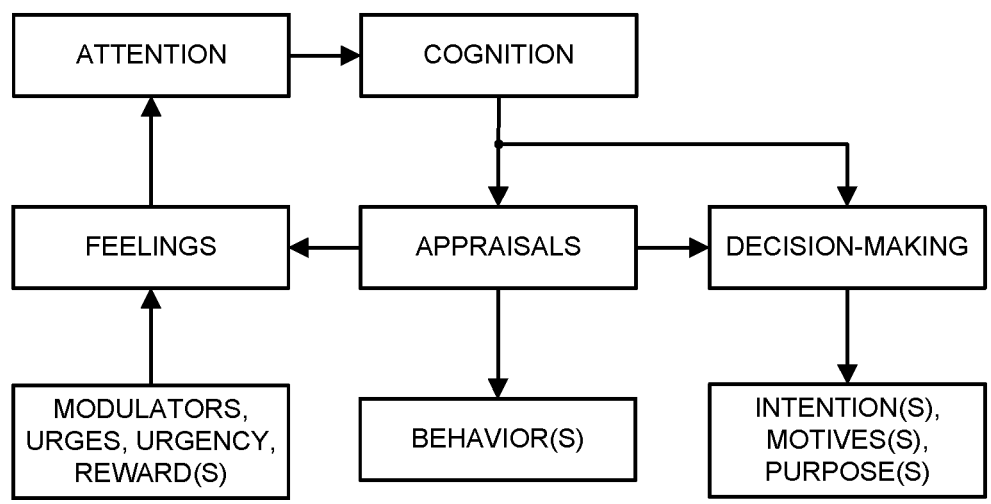
FIG. 11 is a drawing illustrating an example of interactions among components in a dynamic EMM in accordance with an embodiment of the present disclosure.
Figure 12:
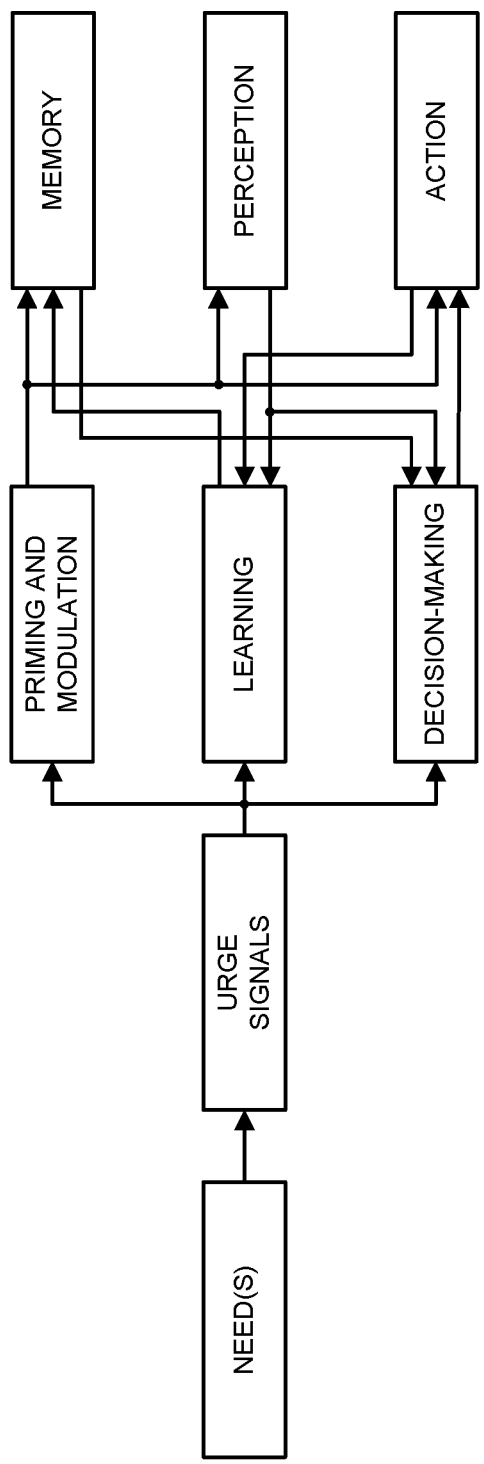
FIG. 12 is a drawing illustrating an example of interactions among components in a dynamic EMM in accordance with an embodiment of the present disclosure.
Figure 13:
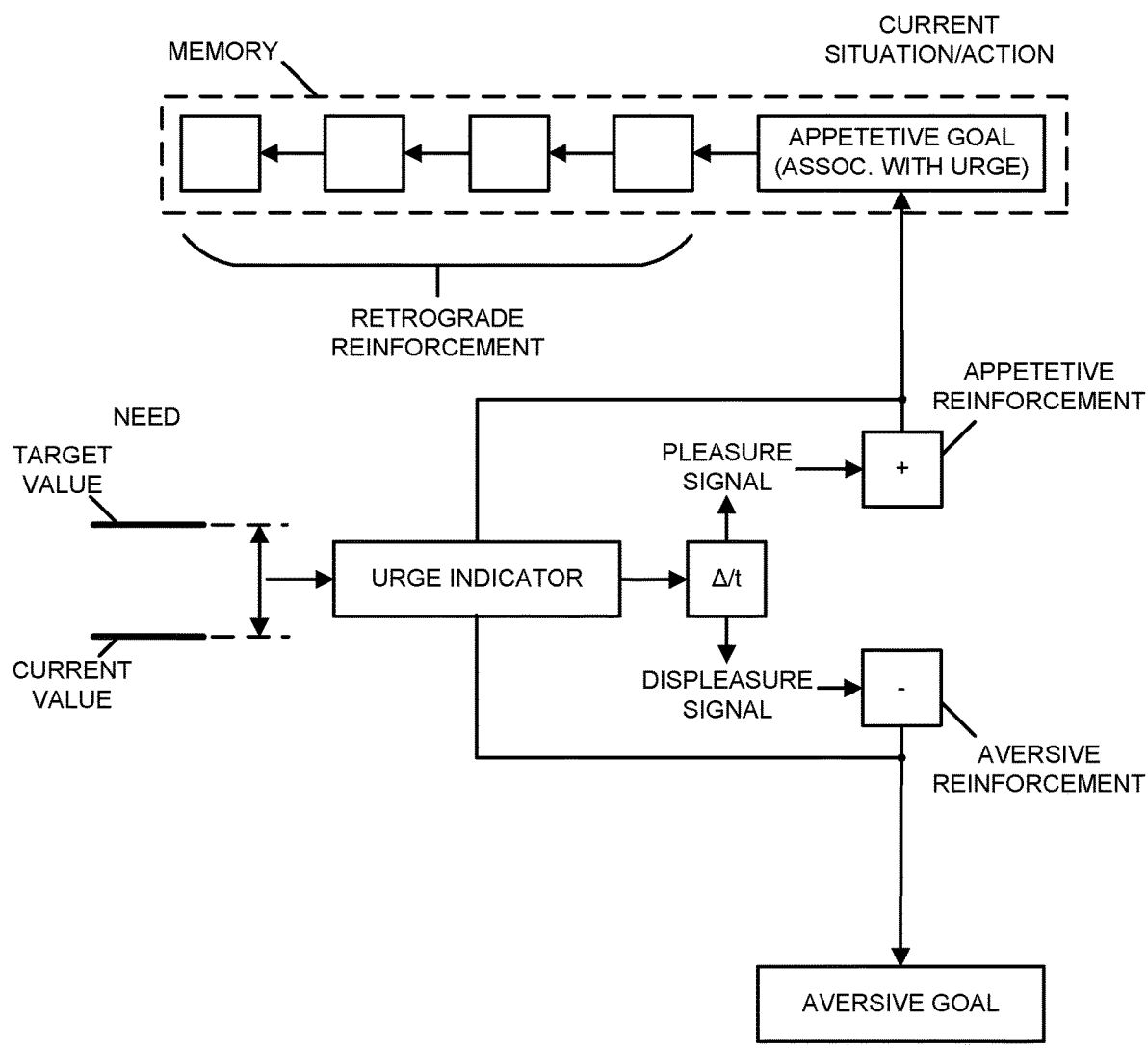
FIG. 13 is a drawing illustrating an example of motivational learning in a dynamic EMM in accordance with an embodiment of the present disclosure.

FIG. 11 presents a drawing illustrating an example of interactions among components in a dynamic EMM in accordance with an embodiment of the present disclosure. Moreover, FIG. 12 presents a drawing illustrating an example of interactions among components in a dynamic EMM in accordance with an embodiment of the present disclosure. Furthermore, FIG. 13 presents a drawing illustrating an example of motivational learning in a dynamic EMM in accordance with an embodiment of the present disclosure.

As discussed previously, in some embodiments dynamic EMM 1000 may include one or more purposes and/or an attentional focus. For example, the presence of one or more purposes in dynamic EMM 1000 may be assessed by checking if there is an immediate reaction (such as a behavioral response and/or emotional response from dynamic EMM 1000) not just to the presence of a past or a current external world or environmental state (such as an event), but to a future external world or environmental state(s) based at least in part on change in expectation. For example, the emotional response of dynamic EMM 1000 may include surprise, anger, joy, etc. to the presence of anticipated or expected events, as opposed to just past or current events. Thus, dynamic EMM 1000 may follow one or more goals that fulfill the one or more purposes based at least in part on their relevance and/or needs. Similarly, the presence of attentional focus in dynamic EMM 1000 may be assessed by determining whether dynamic EMM 1000 has the ability to dynamically and selectively focus on a subset of features that is related to one or more specific current tasks. By shifting the focus of attention between present or anticipated events that are associated with rewards, or features of such events associated with rewards, or events that change the probability of reward associated events, the reaction of the EMM can change accordingly, which allows to influence operations on the representation of plans and events of the agent.

A dynamic EMM for a virtual representation may be trained in a variety of ways. For example, personality testing may be used to determine attributes or characteristics of an individual's personality. These attributes or characteristics may be compared to the results or predictions of a dynamic EMM in different circumstances to determine a set of parameters for the virtual representation. Moreover, by assessing the temporal sequence of changes in the emotional responses and/or behaviors provided by the dynamic EMM for the virtual representation in the different circumstances (e.g., changes may be tracked and/or visualized in real time), a set of parameters may be determined or learned in order to minimize surprises or discontinuous changes in the emotional responses and/or behaviors, thereby constraining the possible states of the dynamic EMM for the virtual representation.

In some embodiments, a set of parameters for a dynamic EMM may be determined based at least in part on emotions (such as six emotions) that may be visible in an individual's face. For example, a camera and an image-processing technique may be used to measure facial expression of the individual. Then, emotional states may be decomposed into components and mapped into corresponding facial expressions (note that on a time scale of approximately 0.1 s, the facial expressions may be instinctive or involuntary). Consequently, the measured facial expressions may be used to determine emotional states and, thus, to train a dynamic EMM (e.g., by determining a set of parameters) for a virtual representation. In some embodiments, the training may use other features, such as voice stress, dialog content and/or acceleration (or a rate of change in one or more features). Note that, because the dynamic EMM focuses on emotional and/or behavioral responses, the set of parameters may be selected to provide emotional integrity, as opposed to cognitive integrity.

The simulation techniques and/or the dynamic EMM may be used in a wide variety of applications in different market segments or industries. For example, while a conversation with a user is used as an illustrative example in the preceding embodiments, in other embodiments the simulation techniques and/or the dynamic EMM may be used to perform or in: psychological testing, a user interface, life tracking (or assessing life habits), communication support (such as a call center), video conferencing, user modeling, a user-assistance systems, etc. Moreover, the simulation techniques and/or the dynamic EMM may be used for: scripting behavior and emotional responses of a virtual representation (such as an artificial agent, a synthetic actor, a computer-game character or an interface agent); modeling the behavior of a user for documentation, evaluating a user-interface, etc.; providing a realistic personality to a virtual assistant, a search engine, or in the responses from a computer, a robot or an electronic device that uses natural language synthesis (and, thus, in human-computer interaction); education; entertainment (such as in interactive media, programming in which a viewer interactively selects a plot, or in providing background information about a character or a scene); animation; content creation; diagnostics (such as healthcare); employee performance tracking or evaluation; hiring assessments; a negotiation assistant (which may measure an individual's emotion state and may provide a negotiation recommendation or a negotiation strategy; a lie detector (and, more generally, for assessing emotional state(s) and behaviors); and/or another type of application.

Machine learning can be used to extend a dynamic EMM. For example, a dynamic EMM may be fit to an individual or a group of individuals (such as a population or cohort) using a machine-learning technique (such as a supervised-learning technique or an unsupervised-learning technique), which may entail modifying the relationships between parameters in the set of parameters, such as the parameters of needs and modulators, and the timing and intensity of expression. Suitable methodologies include but are not limited to regression-based methods (by which parameters of the models are adjusted along a gradient to optimize the fit between observed and predicted behavior), evolutionary methods (by which a population of models is randomly changed over multiple generations, whereby models with more accurate predictions are included in the next generation), attention based methods (where an algorithm identifies those parameters of the model that are most likely going to improve the performance of the model when changed), and other methods of architecture search. Note that the machine-learning technique may include: a support vector machine technique, a classification and regression tree technique, logistic regression, LASSO, linear regression, a neural network technique (such as a convolutional neural network technique, a generative adversarial network or another type of neural network technique) and/or another linear or nonlinear supervised-learning technique. Alternatively or additionally, the machine-learning technique may include: a clustering technique, or another type of unsupervised-learning technique.

In some embodiments, the simulation techniques and/or the dynamic EMM may be used to phenomenologically determine underlying structure associated with personalities. For example, the simulation techniques and/or the dynamic EMM may provide grounding and correlation with existing psychometrics, such as the Big 5 personality traits (openness to experience, conscientiousness, extroversion, agreeableness, neuroticism), the revised NEO personality inventory (including six subcategories or facets for a given Big 5, e.g.: neuroticism: anxiety, hostility/anger, depression, self-consciousness, impulsiveness/immoderation, vulnerability to stress/fear/learned helplessness; extraversion: warmth/kindness, gregariousness, assertiveness, activity level/lively temperament, excitement seeking, positive emotion/cheerfulness/vivacity; openness to experience: fantasy/imagination, aesthetics/artistic interest, feelings/emotionality, actions/adventurous/exploration, ideas/intellectual interest/curiosity, values/psychological liberalism/tolerance to ambiguity; agreeableness: trust in others, straightforwardness/morality, altruism, compliance/cooperation, modesty, tendermindedness/sympathy; conscientiousness: competence/self-efficacy, orderliness/organization, dutifulness/sense of duty/obligation, achievement striving, self-discipline/willpower, deliberation/cautiousness), and/or moral foundations theory. For example, a dynamic EMM may be used to constrain the state of a virtual representation based at least in part on observed or otherwise specified expressive or internal emotional and motivational states in order to infer possible values of these states. Furthermore, a dynamic EMM may be used to model a set of possible and probable states for a virtual representation based at least in part on observations and/or augmenting data sources, such as datasets that are used for training and enhancing the dynamic EMM.

Moreover, in some embodiments the set of parameters using in the dynamic EMM may provide an emotional descriptive language (EDL) for expressing or representing needs, urges, signals, consumptions, modulators and/or expressions. By coupling or connecting the EDL to controllers, a virtual representation may be able to express realistic emotions and behaviors. Furthermore, the EDL may be used to create or generate content for a virtual representation or to augment other forms of content (such as dialog and semantic knowledge that is used for dialog generation).

Figure 14:
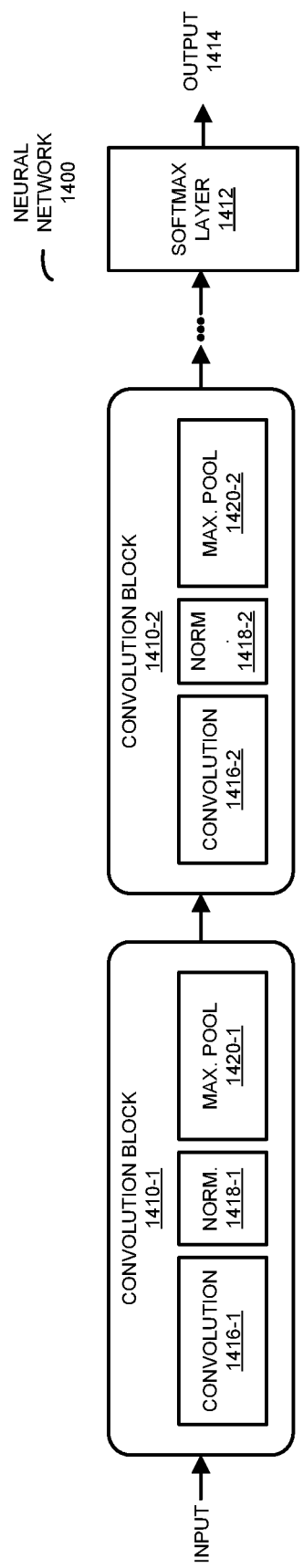
FIG. 14 is a drawing illustrating an example of a neural network in accordance with an embodiment of the present disclosure.

We now further describe neural networks that can be used in any of the embodiments. In the following discussion, the simulation techniques are used as an illustrative example. As shown in FIG. 14, which presents a block diagram illustrating an example of a neural network 1400, in some embodiments of the simulation techniques, one or more operations may be performed using a neural network. Notably, neural network 1400 may include multiple convolutional blocks 1410, arranged sequentially, followed by a softmax layer 1412 (or a normalized exponential function) that provides an output 1414. A given convolution block (such as convolution block 1410-1) may include a given convolution operation (such as convolution operation 1416-1, which may be different from at least some of the other convolution operations 1416), a normalization operation (such as batch normalization 1418-1) and a max pool operation (such as max pool operation 1420-1) in which a maximum value following the normalization operation is selected. Note that the given convolution operation may correspond to a given range (such as a frequency range in an audible band of frequencies, e.g., 50-500 Hz). In general, different convolution blocks 1410 may have different associated ranges, which may or may not overlap with the ranges associated with adjacent (neighboring) convolution blocks in neural network 1400. These capabilities may improve the ability of neural network 1400 to model an output (such as individual's speech).

In some embodiments, a given convolution block (such as convolution block 1410-1) may include a 1×1 convolution, a rectified linear unit plus batch normalization, a 3×3 convolution and a second instance of a rectified linear unit and batch normalization. These operations may be followed by a third instance of a rectified linear unit and a 2×2 max pool operation. These blocks may be repeated zero or more times. Alternatively or additionally, in some embodiments, a given convolution block (such as convolution block 1410-1) may include a 1×1 convolution, a rectified linear unit plus batch normalization, a 3×3 convolution and a second instance of a rectified linear unit plus batch normalization. The output of this convolution block may be combined with the output of a residual convolution block that includes a 1×1 convolution, a rectified linear unit and batch normalization. Then, the combination of these outputs may be followed by a third instance of a rectified linear unit and a 2×2 max pool operation. These blocks may be repeated zero or more times.

For example, the simulation techniques may use one or more convolutional neural networks. A large convolutional neural network may include, e.g., 60 M parameters and 650,000 neurons. The convolutional neural network may include, e.g., eight learned layers with weights, including, e.g., five convolutional layers and three fully connected layers with a final 1000-way softmax or normalized exponential function that produces a distribution over the 1000 class labels. Some of the convolution layers may be followed by max-pooling layers. In order to make training faster, the convolutional neural network may use non-saturating neurons (such as a local response normalization) and an efficient dual parallelized GPU implementation of the convolution operation. In addition, in order to reduce overfitting in the fully-connected layers, a regularization technique (which is sometimes referred to as 'dropout') may be used. In dropout, the predictions of different models are efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional neural network may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In some embodiments, the first convolutional layer filters, e.g., a 224×224×3 input file with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with, e.g., 256 kernels of size 5×5×48. Furthermore, the third, fourth, and fifth convolutional layers may be coupled to one another without any intervening pooling or normalization layers. The third convolutional layer may have, e.g., 384 kernels of size 3×3×256 coupled to the (normalized, pooled) outputs of the second convolutional layer. Additionally, the fourth convolutional layer may have, e.g., 384 kernels of size 3×3×192, and the fifth convolutional layer may have 256 kernels of size 3×3×192. The fully-connected layers may have, e.g., 4096 neurons each. Note that the numerical values in the preceding and the remaining discussion below are for purposes of illustration only, and different values may be used in other embodiments.

In some embodiments, the convolutional neural network is implemented using at least two GPUs. One GPU may run some of the layer parts while the other runs the remaining layer parts, and the GPUs may communicate at certain layers. The input of the convolutional neural network may be, e.g., 150,528-dimensional, and the number of neurons in the remaining layers in the convolutional neural network may be given by, e.g., 253, 440-186, 624-64, 896-64, 896-43, and 264-4096-4096-1000.

We now describe embodiments of an electronic device. FIG. 15 presents a block diagram illustrating an electronic device 1500, such as one of electronic devices 110, the optional base station 112, the optional access point 116 and/or a computer in computer system 118 in FIG. 1. This electronic device includes processing subsystem 1510, memory subsystem 1512, and networking subsystem 1514. Processing subsystem 1510 includes one or more devices configured to perform computational operations (which are sometimes referred to as 'computational devices'). For example, processing subsystem 1510 can include one or more microprocessors, one or more application-specific integrated circuits (ASICs), one or more microcontrollers, one or more programmable-logic devices, one or more GPUs and/or one or more digital signal processors (DSPs).

Memory subsystem 1512 includes one or more devices for storing data and/or instructions for processing subsystem 1510 and networking subsystem 1514. For example, memory subsystem 1512 can include dynamic random access memory (DRAM), static random access memory (SRAM), and/or other types of memory. In some embodiments, instructions for processing subsystem 1510 in memory subsystem 1512 include: one or more program modules or sets of instructions (such as program instructions 1522 or operating system 1524), which may be executed by processing subsystem 1510. Note that the one or more computer programs may constitute a computer-program mechanism. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Figure 16:
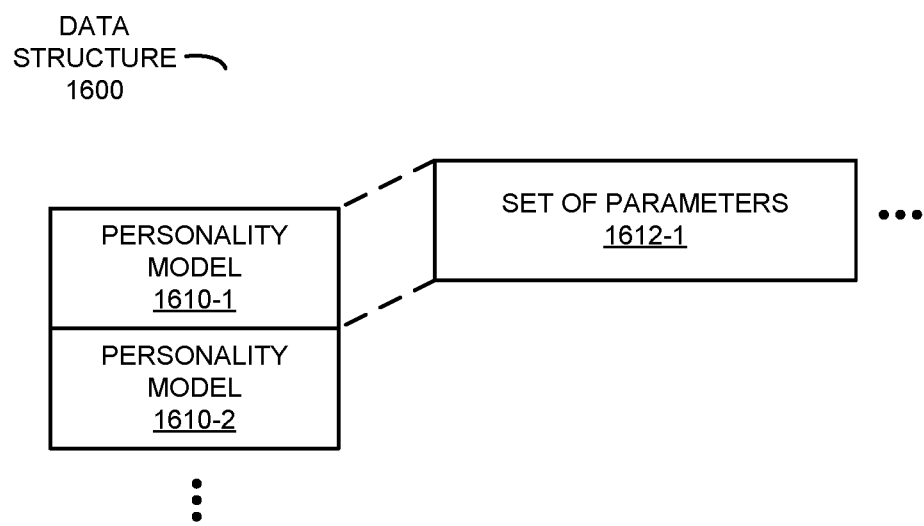
FIG. 16 is a block diagram illustrating a data structure for use in conjunction with the electronic device of FIG. 15 in accordance with an embodiment of the present disclosure.

Memory subsystem 1512 may store information that is used during the simulation techniques. This is shown in FIG. 16, which presents a block diagram illustrating a data structure 1600 for use in conjunction with electronic device 1500 (FIG. 16). This data structure may include multiple personality models 1610 for virtual representations of different individuals, including sets of parameters 1612 for a behavioral and emotional model.

In other embodiments, the order of items in data structure 1600 can vary and additional and/or different items can be included. Moreover, other sizes or numerical formats and/or data can be used.

Referring back to FIG. 15, networking subsystem 1514 includes one or more devices configured to couple to and communicate on a wired and/or wireless network (i.e., to perform network operations), including: control logic 1516, an interface circuit 1518, one or more antennas 1520 and/or input/output (I/O) port 1530. (While FIG. 15 includes one or more antennas 1520, in some embodiments electronic device 1500 includes one or more nodes 1508, e.g., a pad, which can be coupled to one or more antennas 1520. Thus, electronic device 1500 may or may not include one or more antennas 1520.) For example, networking subsystem 1514 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices as described previously.

Within electronic device 1500, processing subsystem 1510, memory subsystem 1512, and networking subsystem 1514 are coupled together using bus 1528. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the subsystems.

In some embodiments, electronic device 1500 includes a sensory subsystem 1526 that includes one or more sensors that capture or perform one or more measurements of an individual, such as a user of electronic device 1500. For example, sensory subsystem 1526 may: capture one or more videos, capture acoustic information and/or perform one or more physiological measurements.

Moreover, electronic device 1500 may include an output subsystem 1532 that provides or presents information associated with a virtual representation. For example, output subsystem 1532 may include a display subsystem (which may include a display driver and a display, such as a liquid-crystal display, a multi-touch touchscreen, etc.) that displays video of the virtual representation and/or one or more speakers that output sound associated with the virtual representation (such as a speech).

Electronic device 1500 can be (or can be included in) any electronic device with at least one network interface. For example, electronic device 1500 can be (or can be included in): a desktop computer, a laptop computer, a subnotebook/netbook, a server, a mainframe computer, a cloud-based computer system, a tablet computer, a smartphone, a cellular telephone, a smart watch, a headset, electronic or digital glasses, headphones, a consumer-electronic device, a portable computing device, an access point, a router, a switch, communication equipment, test equipment, a wearable device or appliance, and/or another electronic device.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or feedback subsystems (such as an audio subsystem). Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments, some or all of a given subsystem or component can be integrated into one or more of the other subsystems or component(s) in electronic device 1500. For example, in some embodiments program instructions 1522 are included in operating system 1524.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1514 (such as a radio) and/or one or more functions of electronic device 1500. Moreover, the integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While communication protocols compatible with Ethernet, Wi-Fi and a cellular-telephone communication protocol were used as illustrative examples, the described embodiments of the simulation techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the simulation techniques may be implemented using program instructions 1522, operating system 1524 (such as a driver for interface circuit 1518) and/or in firmware in interface circuit 1518. Alternatively or additionally, at least some of the operations in the simulation techniques may be implemented in a physical layer, such as hardware in interface circuit 1518.

In the preceding description, we refer to 'some embodiments.' Note that 'some embodiments' describes a subset of all of the possible embodiments, but does not always specify the same subset of embodiments. Moreover, note that the numerical values provided are intended as illustrations of the simulation techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a processor;
memory configured to store program instructions, wherein, when executed by the processor, the program instructions cause the electronic device to perform operations comprising:
receiving sensory inputs associated with a user;
determining, using a pretrained artificial neural network, one or more behavioral or emotional inputs based at least in part on the sensory inputs;
computing, using the program instructions, which are executed by the electronic device, a dynamic modification to a behavioral or an emotional response of a virtual representation based at least in part on the one or more behavioral or emotional inputs, a behavioral and emotional model, and a set of predefined or predetermined parameters, wherein the virtual representation is implemented using a second pretrained artificial neural network, wherein the behavioral and emotional model comprises one or more purposes that reflect a personality of the virtual representation, wherein a given purpose models an expected reward of the virtual representation that is associated with a given need of the virtual representation, wherein the one or more purposes comprise multiple purposes that have a hierarchical arrangement and the dynamic modification of the virtual representation has an accuracy exceeding a predefined value greater than 80% that reduces an amount of adaptation of the virtual representation based at least in part on user feedback, wherein the dynamic modification of the virtual representation facilitates enhanced engagement and emotional response of a user that interacts with the virtual representation, wherein the second pretrained neural network comprises multiple layers having nodes, with associated activation functions and weights, configured to transform an input to the second pretrained neural network to an output of the second pretrained neural network, wherein the output corresponds to the behavioral or emotional response of the virtual representation, and wherein the modification comprises a modification to weights of the second pretrained neural network; and
providing or presenting the dynamic modification to the behavioral or the emotional response of the virtual representation.

2. The electronic device of claim 1, wherein the sensory inputs comprise: one or more images of the user, audio information associated with the user, or a physiological response of the user.

3. The electronic device of claim 1, wherein the one or more behavioral or emotional inputs comprise: a facial expression, a posture, a gaze direction, a gaze pattern, a blinking frequency, a muscular tension, a head position, or a gesture of the user; a syntax, a tone or pitch, an intensity, an inflection, or a prosodic characteristic associated with speech of the user; or a pulse, a respiration, blood pressure, a vital sign, skin temperature, skin conductance or flushing or local capillary dilation of the user.

4. The electronic device of claim 1, wherein the operations comprise receiving information that specifies a characteristic or an attribute of an environment of the user; and
wherein the modification to the behavioral or the emotional response of the virtual representation is based at least in part on the characteristic or the attribute.

5. The electronic device of claim 1, wherein the reward corresponds to pleasure for satisfaction of the given need and corresponds to pain for frustration of the given need.

6. The electronic device of claim 1, wherein the given need comprises: a physiological need, a social need or a cognitive need.

7. The electronic device of claim 1, wherein the behavioral and emotional model comprises a dynamic attentional focus and the behavioral or the emotional response of the virtual representation is based at least in part on the attentional focus.

8. The electronic device of claim 7, wherein the dynamic attentional focus is based at least in part on the behavioral or the emotional response of the virtual representation.

9. A non-transitory computer-readable storage medium for use in conjunction with an electronic device, the computer-readable storage medium configured to store program instructions that, when executed by the electronic device, causes the electronic device to perform operations comprising:
receiving sensory inputs associated with a user;
determining, using a pretrained artificial neural network, one or more behavioral or emotional inputs based at least in part on the sensory inputs;
computing, using the program instructions, which are executed by the electronic device, a dynamic modification to a behavioral or an emotional response of a virtual representation based at least in part on the one or more behavioral or emotional inputs, a behavioral and emotional model, and a set of predefined or predetermined parameters, wherein the virtual representation is implemented using a second pretrained artificial neural network, where in the behavioral and emotional model comprises one or more purposes that reflect a personality of the virtual representation, wherein a given purpose models an expected reward of the virtual representation that is associated with a given need of the virtual representation, wherein the one or more purposes comprise multiple purposes that have a hierarchical arrangement and the dynamic modification of the virtual representation has an accuracy exceeding a predefined value greater than 80% that reduces an amount of adaptation of the virtual representation based at least in part on user feedback, wherein the dynamic modification of the virtual representation facilitates enhanced engagement and emotional response of a user that interacts with the virtual representation, wherein the second pretrained neural network comprises multiple layers having nodes, with associated activation functions and weights, configured to transform an input to the second pretrained neural network to an output of the second pretrained neural network, wherein the output corresponds to the behavioral or emotional response of the virtual representation, and wherein the modification comprises a modification to weights of the second pretrained neural network; and providing or presenting the dynamic modification to the behavioral or the emotional response of the virtual representation.

10. The non-transitory computer-readable storage medium of claim 9, wherein the sensory inputs comprise: one or more images of the user, audio information associated with the user, or a physiological response of the user.

11. The non-transitory computer-readable storage medium of claim 9, wherein the one or more behavioral or emotional inputs comprise: a facial expression, a posture, a gaze direction, a gaze pattern, a blinking frequency, a muscular tension, a head position, or a gesture of the user; a syntax, a tone or pitch, an intensity, an inflection, or a prosodic characteristic associated with speech of the user; or a pulse, a respiration, blood pressure, a vital sign, skin temperature, skin conductance or flushing or local capillary dilation of the user.

12. The non-transitory computer-readable storage medium of claim 9, wherein the operations comprise receiving information that specifies a characteristic or an attribute of an environment of the user; and wherein the modification to the behavioral or the emotional response of the virtual representation is based at least in part on the characteristic or the attribute.

13. The non-transitory computer-readable storage medium of claim 9, wherein the behavioral and emotional model comprises a dynamic attentional focus and the behavioral or the emotional response of the virtual representation is based at least in part on the attentional focus.

14. A method for providing a virtual representation, comprising:

by an electronic device:

receiving sensory inputs associated with a user;

determining, using a pretrained artificial neural network, one or more behavioral or emotional inputs based at least in part on the sensory inputs;

computing, using program instructions, which are executed by the electronic device, a dynamic modification to a behavioral or an emotional response of the virtual representation based at least in part on the one or more behavioral or emotional inputs, a behavioral and emotional model, and a set of predefined or predetermined parameters, wherein the virtual representation is implemented using a second pretrained artificial neural network, wherein the behavioral and emotional model comprises one or more purposes that reflect a personality of the virtual representation, wherein a given purpose models an expected reward of the virtual representation that is associated with a given need of the virtual representation, wherein the one or more purposes comprise multiple purposes that have a hierarchical arrangement and the dynamic modification of the virtual representation has an accuracy exceeding a predefined value greater than 80% that reduces an amount of adaptation of the virtual representation based at least in part on user feedback, wherein the dynamic modification of the virtual representation facilitates enhanced engagement and emotional response of a user that interacts with the virtual representation, wherein the second pretrained neural network comprises multiple layers having nodes, with associated activation functions and weights, configured to transform an input to the second pretrained neural network to an output of the second pretrained neural network, wherein the output corresponds to the behavioral or emotional response of the virtual representation, and wherein the modification comprises a modification to weights of the second pretrained neural network; and providing or presenting the dynamic modification to the behavioral or the emotional response of the virtual representation.

15. The method of claim 14, wherein the sensory inputs comprise: one or more images of the user, audio information associated with the user, or a physiological response of the user.

16. The method of claim 14, wherein the one or more behavioral or emotional inputs comprise: a facial expression, a posture, a gaze direction, a gaze pattern, a blinking frequency, a muscular tension, a head position, or a gesture of the user; a syntax, a tone or pitch, an intensity, an inflection, or a prosodic characteristic associated with speech of the user; or a pulse, a respiration, blood pressure, a vital sign, skin temperature, skin conductance or flushing or local capillary dilation of the user.

17. The method of claim 14, wherein the operations comprise receiving information that specifies a characteristic or an attribute of an environment of the user; and wherein the modification to the behavioral or the emotional response of the virtual representation is based at least in part on the characteristic or the attribute.

18. The method of claim 14, wherein the behavioral and emotional model comprises a dynamic attentional focus and the behavioral or the emotional response of the virtual representation is based at least in part on the attentional focus.

19. The method of claim 14, wherein the reward corresponds to pleasure for satisfaction of the given need and corresponds to pain for frustration of the given need.

20. The method of claim 14, wherein the given need comprises: a physiological need, a social need or a cognitive need.

* * * * *